(12) United States Patent
Rao et al.

(10) Patent No.: US 10,924,834 B1
(45) Date of Patent: *Feb. 16, 2021

(54) DISPLAY DEVICE WITH TRANSVERSE PLANAR MICROPHONE ARRAYS

(71) Applicant: Amazon Technologies, Inc., Seattle, WA (US)

(72) Inventors: Anurupa Rao, Sunnyvale, CA (US); Paul Drucker, Escondido, CA (US); Subum Park, Dublin, CA (US); Jiger Patel, Sunnyvale, CA (US); Sanditi Khandelwal, Mountain View, CA (US); Amita Pawar, San Jose, CA (US); Kei Yamamoto, Cupertino, CA (US); Wentao Cheng, Shenzen (CN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,642

(22) Filed: Oct. 11, 2019

Related U.S. Application Data

(63) Continuation of application No. 16/018,989, filed on Jun. 26, 2018, now Pat. No. 10,484,770.

(51) Int. Cl.
*H04R 1/04* (2006.01)
*H04R 1/40* (2006.01)
*H04R 1/02* (2006.01)
*G06F 3/16* (2006.01)
*G06F 1/16* (2006.01)
*G06F 3/041* (2006.01)

(52) U.S. Cl.
CPC .............. *H04R 1/04* (2013.01); *G06F 1/1601* (2013.01); *G06F 3/167* (2013.01); *H04R 1/025* (2013.01); *H04R 1/406* (2013.01); *G06F 3/041* (2013.01); *H04R 2499/15* (2013.01)

(58) Field of Classification Search
None
See application file for complete search history.

(56) References Cited

U.S. PATENT DOCUMENTS

| | | |
|---|---|---|
| 2002/0135294 A1 | 9/2002 | Fujishiro et al. |
| 2003/0125959 A1 | 7/2003 | Palmquist |
| 2006/0044746 A1 | 3/2006 | Kim et al. |
| 2006/0277049 A1 | 12/2006 | Huang |
| 2009/0041283 A1 | 2/2009 | Ishibashi et al. |
| 2009/0274333 A1 | 11/2009 | Lan et al. |

(Continued)

*Primary Examiner* — Qin Zhu
(74) *Attorney, Agent, or Firm* — Eversheds Sutherland (US) LLP

(57) ABSTRACT

Systems, methods, and computer-readable media are disclosed for display devices with transverse planar microphone arrays. In one embodiment, an example device may include a frame that forms a rear portion of the device, a display assembly coupled to the frame, where the display assembly forms a front portion of the device, and a first microphone hole extending through a front face of the display assembly. The device may include a second microphone hole extending through the front face of the display assembly, a speaker coupled to the frame, a power adapter receptacle coupled to the frame, and a fabric cover disposed over the frame, the fabric cover comprising an aperture aligned with the power adapter receptacle. Sound output from the speaker may be directed towards the rear portion of the device.

18 Claims, 16 Drawing Sheets

(56) References Cited

U.S. PATENT DOCUMENTS

| | | | |
|---|---|---|---|
| 2009/0316056 A1* | 12/2009 | Rosencwaig | G06F 1/1601 |
| | | | 348/836 |
| 2010/0246877 A1 | 9/2010 | Wang et al. | |
| 2011/0001706 A1 | 1/2011 | Sanford et al. | |
| 2012/0224299 A1* | 9/2012 | Myers | H05K 5/0086 |
| | | | 361/679.01 |
| 2012/0300969 A1 | 11/2012 | Tanaka et al. | |
| 2013/0048837 A1* | 2/2013 | Pope | G01J 1/0422 |
| | | | 250/214.1 |
| 2014/0241551 A1* | 8/2014 | Kim | H04R 3/12 |
| | | | 381/306 |
| 2014/0341417 A1 | 11/2014 | McGarry et al. | |
| 2015/0053497 A1* | 2/2015 | Horiuchi | H04N 5/642 |
| | | | 181/199 |
| 2015/0092334 A1* | 4/2015 | Hayashida | G06F 1/1601 |
| | | | 361/679.21 |
| 2015/0195635 A1 | 7/2015 | Garfio et al. | |
| 2016/0345086 A1* | 11/2016 | Chamberlin | H02J 7/0042 |
| 2017/0242478 A1 | 8/2017 | Ma | |
| 2018/0084323 A1* | 3/2018 | Luce | H04R 1/028 |
| 2018/0174584 A1* | 6/2018 | Chih | H04R 3/005 |
| 2019/0069078 A1* | 2/2019 | Johnson | H04R 1/086 |

\* cited by examiner

DISPLAY DEVICE WITH TRANSVERSE PLANAR MICROPHONE ARRAYS

CROSS-REFERENCE TO RELATED APPLICATION

This application is a continuation of U.S. application Ser. No. 16/018,989, filed Jun. 26, 2018, which is incorporated by reference in its entirety.

BACKGROUND

Electronic devices may be used in loud or noisy environments. Some electronic devices may be voice-based devices and may detect voice commands. However, in certain environments, electronic devices may be subject to dynamic conditions, including noise, speech or voice from multiple individuals, and so forth. For such devices, detecting voice inputs and/or determining information to present at a display device may be difficult. Accordingly, electronic devices that can provide detect voice commands in various environments may be desired.

Figure 1:
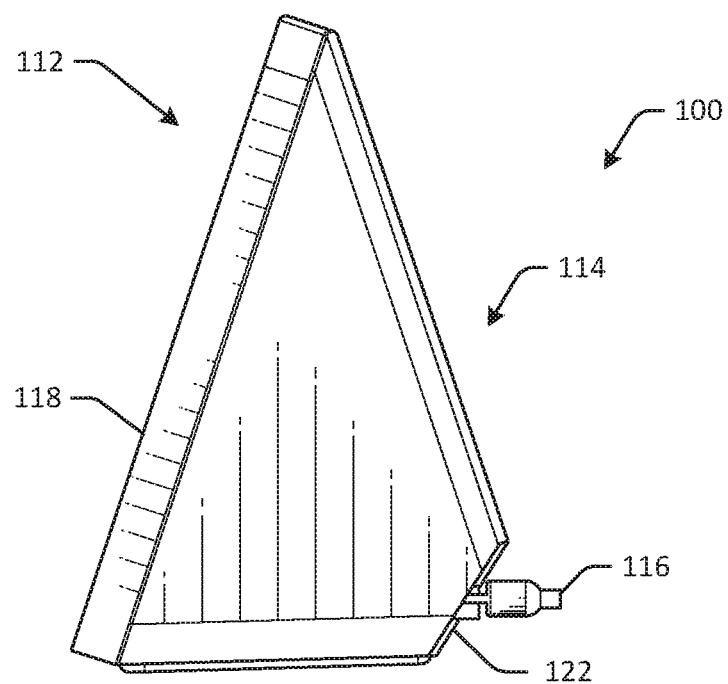
FIG. 1 is a schematic drawing of a display device with transverse planar microphone arrays in a side view in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may encompass, depending on the context, a plural number of such components or elements and vice versa.

DETAILED DESCRIPTION

Overview

Operation of some electronic devices may be voice-based. For example, certain electronic devices may be controlled by voice-based commands or may otherwise respond to verbal or audible utterances. In another example, electronic devices may detect sounds in an ambient environment and may determine that a voice assistant is being invoked based on, for example, detection of a wakeword or other trigger. A user may say or utter the wakeword to invoke the voice assistant. The voice assistant device may detect the wakeword and listen for a request or voice command, and may respond accordingly. For example, the voice assistant device may cause one or more operations to be performed, such as presentation of certain information at a display of the electronic device (e.g., weather, news, messages, etc.), controlling other devices (e.g., televisions, lights, radios, thermostats, etc.), audio information (e.g., weather, news, messages, etc.), and/or may perform different actions in response to a request or command. During interaction with a user, certain electronic devices may provide a visual indicator that is indicative of interaction with one or more users. For example, voice assistant devices may include one or more light emitting diodes (LEDs), lighting elements, light bars, displays, and/or other visual indicators that may indicate to a user that the voice assistant device is active, listening, not listening, processing, speaking, and/or other actions.

In some environments, such as in a kitchen environment, outdoor environments, and the like, interaction with electronic devices may be difficult due to unpredictable conditions, such as ambient noise, sounds, and so forth. In such environments, detection of a wakeword and/or a voice command may be difficult, as the wakeword or voice command may be difficult to distinguish from background sounds.

Embodiments of the disclosure may include display devices that may be portable and are configured to operate in various ambient environments, such as noisy conditions, outdoor conditions, etc., while maintaining audible and/or visual interaction capabilities with users. For example, embodiments of the disclosure may include microphone arrays that are mounted on microphone boards positioned at transverse planes. For example, a first set of microphones may be oriented to capture sound through a top surface of an electronic device, while a second set of microphones may be oriented to capture sound through a front surface or front face of the electronic device. By using microphones positioned at transverse planes, detection of wake words and other user utterances may be improved as a result of improved beamforming. In addition, determination of a direction and/or distance of a user from which a voice command was received may be improved. As a result, embodiments of the disclosure may accurately detect user utterances, such as wake words, voice commands, and the like in different ambient environments. Certain embodiments may include features such as edge-to-edge displays for presentation of visual information, as well as power adapter jacks configured for specific yank strengths.

The techniques, methods, and processes described herein may be used to detect and/or determine voice-based requests or commands, and to initiate actions that may include controlling other electronic devices and/or presenting audio or visual information. For example, certain embodiments may be configured to output signals that control aspects of smart homes, such as HVAC systems, stereo settings, windows, lights, and so forth, and may be configured to output visual information via a display of the device.

This disclosure relates to, among other things, systems, methods, computer-readable media, techniques, and methodologies for display device with transverse planar microphone arrays. Embodiments may include devices that can be voice-controlled and respond to audible instructions, output audio and visual content, control other electronic devices and/or other operations. Some embodiments may be configured to detect a location or direction of sound or a sound source, or a location of a user that is currently being listened to by the device, as well as device states, such as a listening state, a processing state, a muted or privacy state, and/or other states. As a result, embodiments of the disclosure may be configured to provide audio and/or visual information to users in various environments.

Figure 2:
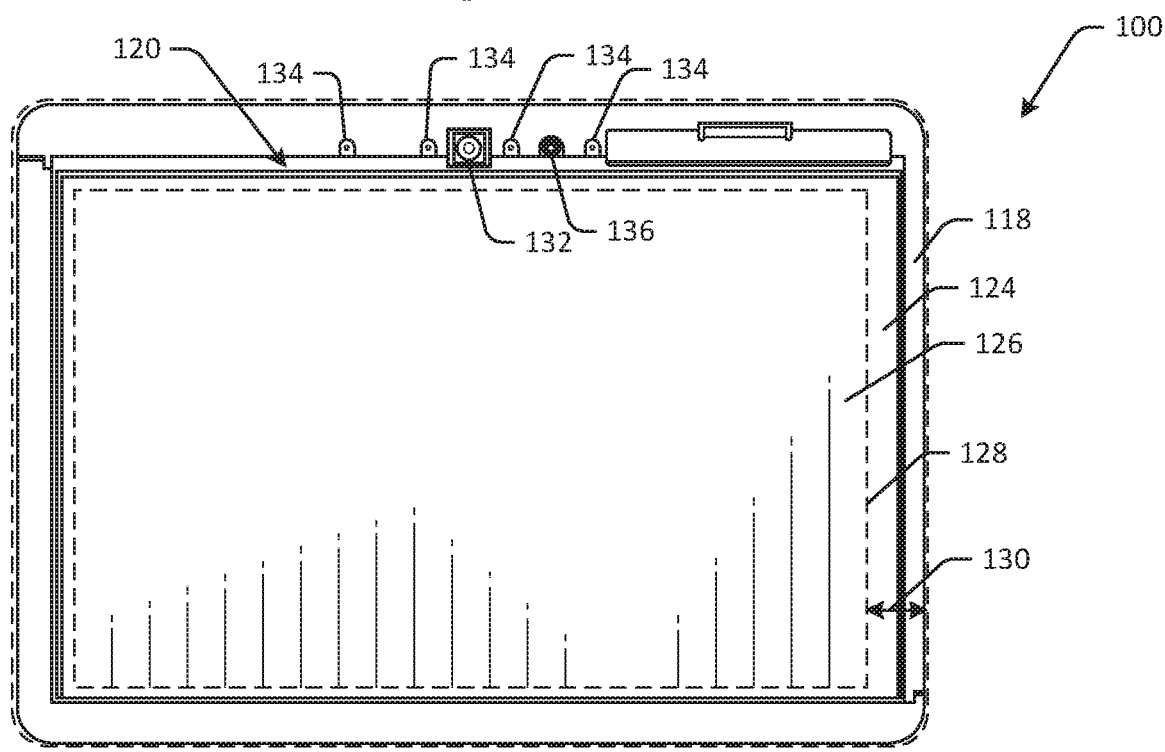
FIG. 2 is a schematic drawing of a display device with transverse planar microphone arrays in a front view in accordance with one or more embodiments of the disclosure.
Figure 3:
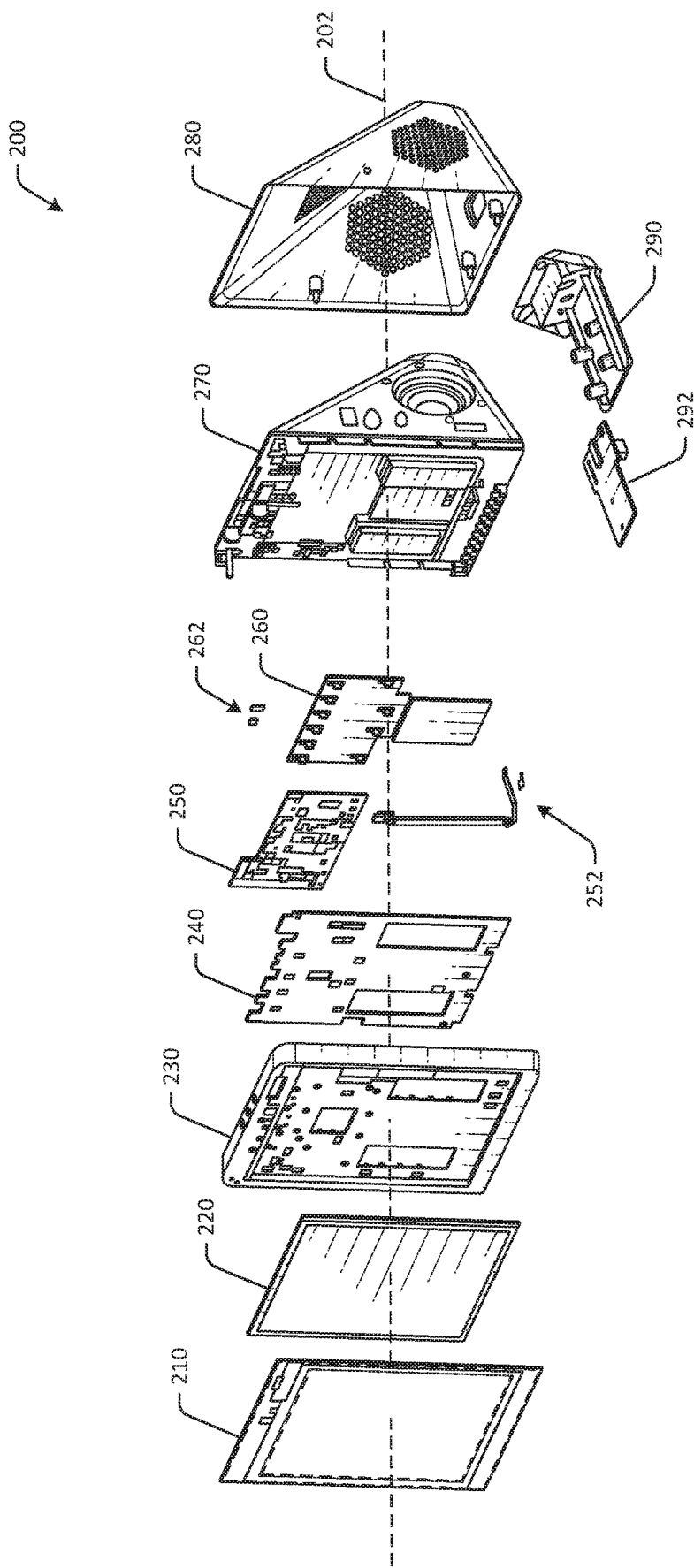
FIG. 3 is a schematic drawing of a display device with transverse planar microphone arrays in an exploded view in accordance with one or more embodiments of the disclosure.

Referring to FIGS. 1-3, an example display device 100 is depicted in accordance with one or more embodiments of the disclosure. FIG. 1 depicts the display device 100 in a side view and FIG. 2 depicts the display device 100 in a side view. The display device 100 may be portable and may be configured for use in indoor environments that may be subject to liquid exposure, such as in a kitchen environment. The display device 100 may have a housing 110. The housing 110 may be formed of one or more portions. For example, the housing 110 may include a front portion 112 and a rear portion 114. The front portion 112 may be a display portion and the rear portion 114 may be a speaker box portion ("top," "bottom," "front," "rear," and "side" are used to describe relative and not absolute positioning). A power adapter 116 may be configured to be coupled to the rear portion 114 of the display device 110.

The front portion 112 may include a front face 118 that is inclined relative to a vertical plane. A display assembly 120 may be coupled to the front face 118. The display assembly 120 may include a display layer, such as an LED display, a touch screen layer, and/or a protective layer, such as a cover glass layer.

The rear portion 114 may form an internal cavity and may include one or more speakers. The internal cavity may be sealed, so as to provide an airtight or substantially airtight volume for sound generation. The rear portion 114 may include a number of surfaces and may have a semi-conical geometry. In some embodiments, the rear portion 114 may include a rear surface 122 that is transverse to the front face 118. In some embodiments, the rear surface 122 may be parallel to the front face 118.

The display assembly 120 may include a frame 124, a display 126, and a cover glass layer 128. The frame 124 may support one or more components of the display assembly 120. The frame 124 may be molded and machined, and may optionally be painted. The cover glass layer 128 may be optically aligned with the display 126. The display assembly 120 may not include a bezel or may have a minimal bezel. For example, an edge of the frame 124 on one or more sides of the display 126 may have a width of equal to or less than about 0.25 inches. The cover glass layer 128 may be smaller in length and/or width with respect to the frame 124. For example, a distance 130 between an edge of the cover glass layer 128 and an edge of the display assembly 120 may be equal to or less than about 0.2 inches. By using a cover glass layer 128 that has at least one dimension (e.g., length, width, etc.) that is less than the display 126 and/or the frame 124, the display 126 may be protected against damage in the event of the device 100 is dropped.

A camera 132 may be mounted at the front portion 112. The camera 132 may be coupled to the frame 124. The camera 132 may be configured to capture images and/or video of an ambient environment adjacent to the front face 118 of the device 100.

A first set of one or more microphone ports or microphone holes 134 may extend through the cover glass layer 128 and/or the frame 124. The first set of microphone holes 134 may be through holes and may have a depth that varies based, at least in part, on a thickness of the cover glass layer 128. The first set of microphone holes 134 may be disposed along a top of the display 126 and may be aligned in a row along a lateral axis of the display assembly 120 and/or frame 124. In other embodiments, microphone holes may be disposed in different locations at the front face 118 and may not be arranged in a row.

The display device 100 may include one or more microphones may be omnidirectional microphones and may be configured to detect sound and/or generate an audio signal. The microphones may be positioned within the housing of the device 100 and may correspond to the locations of one or more microphone holes on the housing 110. In some embodiments, the display device 100 may include one or more microphone arrays with respective pluralities of microphones. The microphone arrays may include individual microphones arranged or oriented so as to detect sounds from either a "left" side, a "right" side, a "front," or a "top" of the display device 100.

A proximity sensor 136 may be included and may be configured to determine presence of a moving object and/or a distance between a user and the device 100 in an ambient environment of the device 100.

FIG. 3 is a schematic drawing of a display device 200 with transverse planar microphone arrays in an exploded view in accordance with one or more embodiments of the disclosure. The display device 200 may have a central axis 202 extending through a center of a width of the display device 200. The display device 200 may include one or more components, such as those illustrated in the example of FIG. 3.

The display device 200 may include a display assembly with a touch panel 210 coupled to an LCD module 220. The touch panel 210 may be configured to detect touch inputs from a user. The LCD module 220 may be configured to display visual information.

The display assembly may be coupled to a first side or a front side of a frame component 230. The frame component may include one or more microphone holes and one or more microphone boards with microphones(s) configured to detect ambient sound. The frame component 230 may be formed at least partially of plastic and may include injection molded inserts of metal to reinforce corners of the device 200, so as to prevent damage to the display assembly in the event of a fall.

A first thermal plate 240 may be coupled to a second side or a rear side of the frame component 230. The first thermal plate 240 may be configured to direct heat in a certain direction and/or prevent certain device components from thermal events, such as overheating.

A main circuit board 250 may be coupled to the frame component 230 and/or the first thermal plate 240. The first thermal plate 240 may be disposed between the main circuit board 250 and the frame component 230. A flexible printed circuit 252 may be coupled to the main circuit board 250 and may be secured using one or more brackets.

A second thermal plate 260 may be coupled to the frame component 230 and may be disposed on an opposite side of the main circuit board 250 with respect to the first thermal plate 240. The second thermal plate 260 may have a different geometry and different dimensions than the first thermal plate 240, or may have the same dimensions. The second thermal plate 260 may protect one or more device components, such as the main circuit board 250, from thermal events. One or more grounding clips 262 may be positioned adjacent to the second thermal plate 260, as described with respect to FIG. 14.

A speaker box 270 may form a rear housing of the device 100. The speaker box 270 may include one or more speakers and may include a passive radiator to assist with output of certain bass frequencies. The speaker box 270 may be enclosed and may be substantially airtight.

A fabric cover 280 may be disposed about the speaker box 270 and/or about the speaker box 270 and a portion of the frame component 230. The fabric cover 280 may be formed of a single jersey construction and may be treated with a water and/or oil resistant coating.

A doghouse cover 290 may be coupled to the speaker box 270 and may protect an input/output board 292. Ports positioned on the input/output board 292 may be accessible through openings on the doghouse cover 290.

Figure 4:
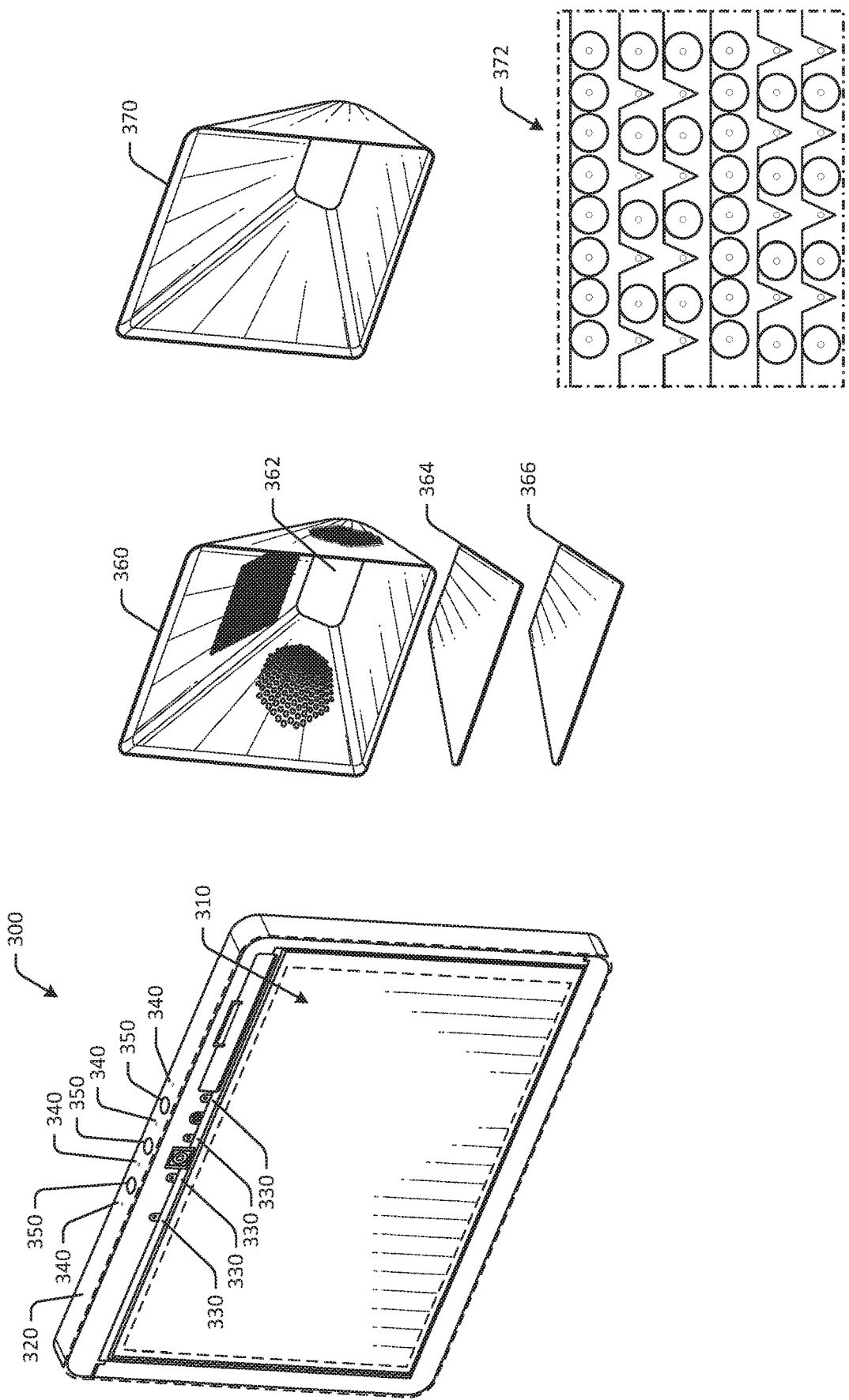
FIG. 4 is a schematic drawing of portions of a display device with transverse planar microphone arrays in an exploded view in accordance with one or more embodiments of the disclosure.

FIG. 4 is a schematic drawing of portions of a display device with transverse planar microphone arrays in an exploded view in accordance with one or more embodiments of the disclosure.

A frame component 300 of a display device is illustrated in accordance with one or more embodiments of the disclosure. The frame component 300 may at least partially form a front end of the device. A display assembly 310 may be coupled to a first side, or a front side of the frame component 300.

The frame component 300 may include a top side or a top surface 320 that extends from the front side of the frame component 300. The top surface 320 or top side may form a sidewall extending about a perimeter of the frame component 300. In some embodiments, the frame component 300 may be a plastic frame component having a first portion that forms a front face of the frame component 300, and a second portion extending substantially perpendicularly from the first portion thereby forming a top portion. The first portion may include a front surface and a rear surface, and the second portion may include an upper surface and a lower surface.

The frame component 300 may include a first set of microphone holes extending through the top side 320 of the frame component 300. For example, in FIG. 4, the frame component 300 may include a first set of four microphone holes 340. Any number may be included. The microphone holes 340 may be spaced apart equal or varying distances. For example, the microphone holes 340 may be spaced between about 10 millimeters and about 15 millimeters, such as about 14 millimeters. The top side 320 may have a width of about 16 millimeters. The microphone holes 340 may be disposed in a row along a center axis of the top side 320 (e.g., if the width of the top side 320 is 16 millimeters, the microphone holes 340 may be disposed approximately 8 millimeters from either lateral edge of the top side 320, etc.). In other embodiments, the microphone holes 340 may not be arranged in a row and may be disposed at different locations along the top side 320.

One or more buttons 350 may be accessible via openings in the top side 320 of the frame component 300. For example, users may press one or more buttons disposed along the top side 320 of the frame component 300. As illustrated in FIG. 4, the device 100 may include one or more pressable or physical buttons 350. The buttons 350 may be disposed along the top surface 320 of the frame component 300. The display device may include a privacy button or a mute button that includes a raised protrusion or other tactile feature that can be used to locate the privacy button, volume control buttons, an action button, and/or other buttons.

The frame component 300 may include a second set of microphone holes 330 extending through a front face or front side of the frame component 300. The second set of microphone holes 330 may include four microphone holes that may be aligned with respective microphone holes of the first set of microphone holes 340. The second set of microphone holes 330 may be disposed in a row along a lateral axis of the frame component 300. The second set of microphone holes 330 may extend through a protective cover layer, such as a cover glass layer, of the display assembly 310.

The depth or port length of the first set of microphone holes 340 may be less than the depth or port length of the second set of microphone holes 330. For example, the depth or port length of the first set of microphone holes 340 may be about 4 millimeters, which may be less than the depth or port length of the second set of microphone holes 330, which may be about 6 millimeters. The thickness of the cover layer of the display assembly 310 may affect the depth or port length of the second set of microphone holes 330. The microphone holes 330, 340 may be through holes and may have a depth that varies based, at least in part, on a thickness of the top surface 320. In other embodiments, microphone holes may be disposed in different locations along the top surface 144 and may not be arranged in a row.

FIG. 4 illustrates the rear portion 114 of the housing of the device in an exploded view, in accordance with one or more embodiments. The device may include a plastic housing 360. The plastic housing 360 may be disposed over or about a speaker box and may form the rear portion of the housing. The plastic housing 360 may include one or more through holes positioned adjacent to speakers, so as to allow sound to escape from the device. The plastic housing 360 may include an opening 362 that can be used to access a power adapter receptacle. A pressure sensitive adhesive layer 364 may be disposed on a lower surface of the plastic housing 360. One or more rubber feet 366 may be adhered to the lower surface of the plastic housing 360 using the pressure sensitive adhesive layer 364. The rubber foot 366 may provide grip and/or support for the device.

A mesh fabric layer 370 may be coupled to the plastic housing 370. The mesh fabric layer may or may not include the through holes for sound wave transmission, but may be constructed of a knit material configured to allow sound waves to pass through the mesh fabric layer 370 unobstructed. For example, the mesh fabric layer 370 may be formed of a material with a construction 372. As illustrated in the construction 372, the material may be a composite polyester and cationic polyester material and may be formed of a drawn textured yarn manufactured using weft knitting. The construction 372 may be single jersey on a single needle bed with double pique. The mesh fabric cover 370 may have a geometry matching that or substantially matching that of the plastic housing 360. The mesh fabric layer 370 may be removable from the plastic housing 360. The mesh fabric layer 370 may include a spray-on or dip-in oil, water, and/or other liquid repellant material on an outer surface of the mesh fabric layer 370. The fabric may be of any suitable color, including charcoal, sandstone, mid-grey, white, and so forth. In some instances, fabric may be made of yarn having a 50% polyester and 50% cationic polyester composition, with a drawn textured yarn ("false twist") texture. The yarn may be knit using a weft knitting process and may be formed using a single bed machine with 24 gauge. A loop length may be about 13.5 centimeters per fifty loops. The fabric may have a density of about 75+/−3 courses×34+/−2 wales and a thickness of about 0.5 millimeters. The fabric may have a weight of about 160 grams/square meter.

Figure 5:
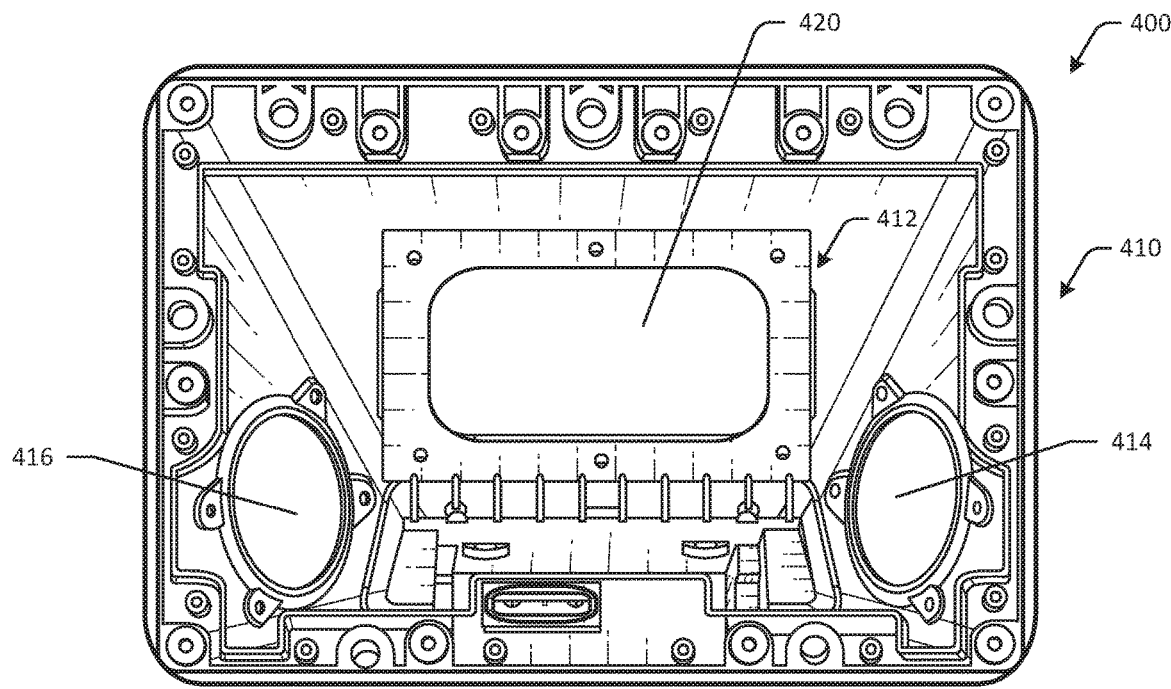
FIGS. 5-7 are schematic drawings of a speaker box assembly in accordance with one or more embodiments of the disclosure.
Figure 6:
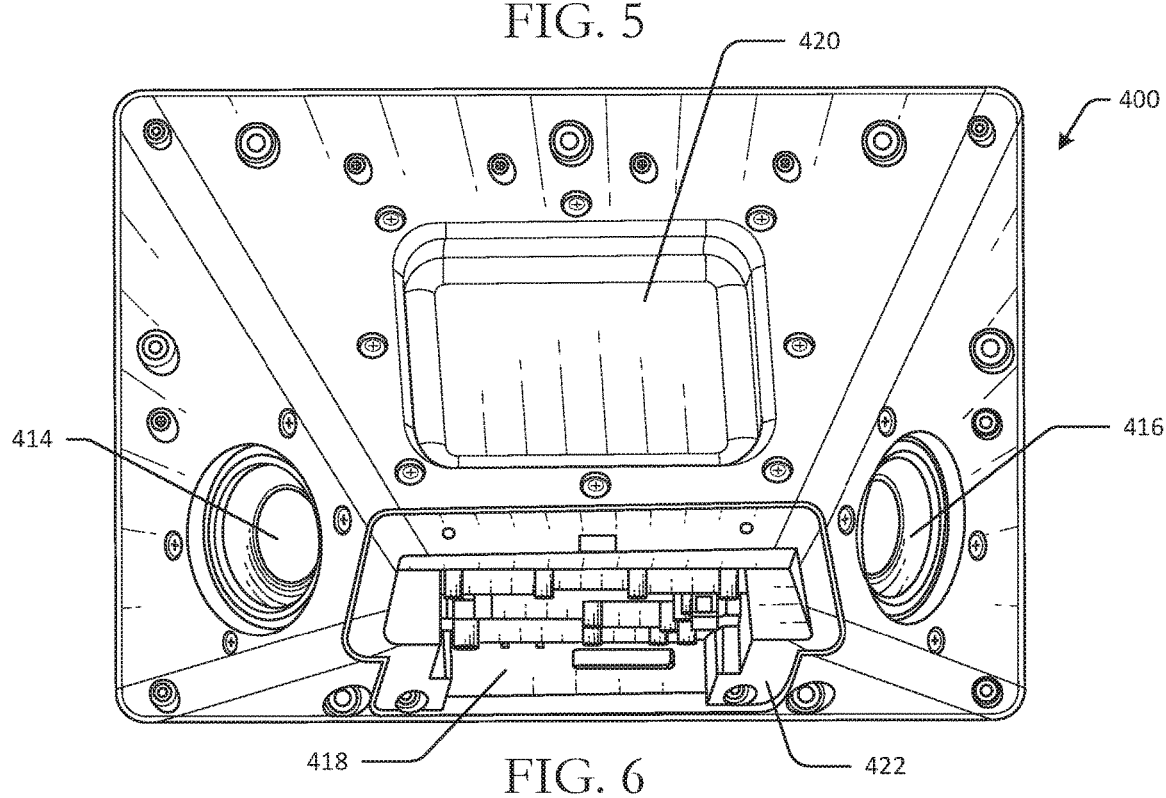
Figure 7:
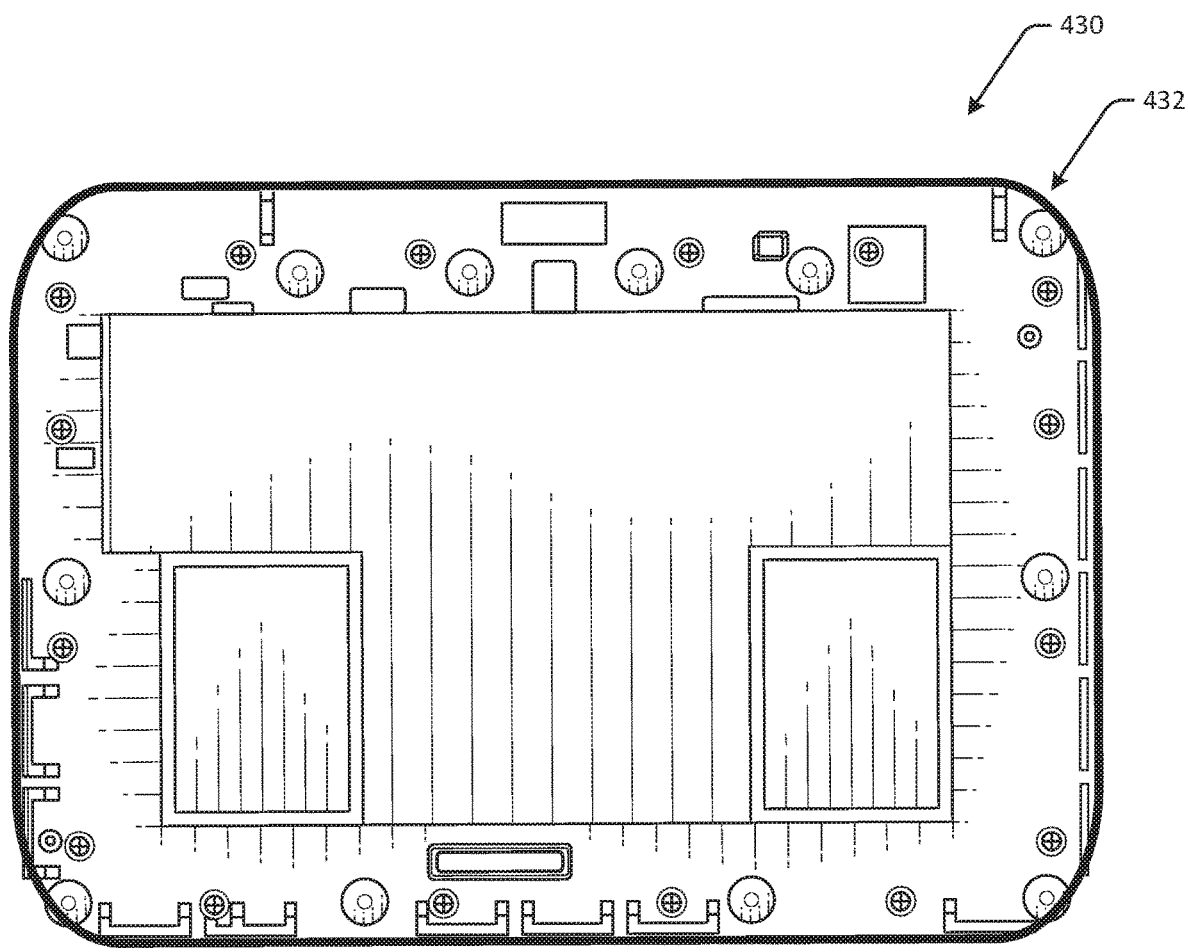

FIGS. 5-7 are schematic drawings of a speaker box assembly 400 in accordance with one or more embodiments of the disclosure. FIG. 5 depicts an interior view of a speaker box assembly 410, FIG. 6 depicts an exterior rear view of the speaker box assembly 410, and FIG. 7 depicts an exterior front view 430 of the speaker box assembly 410. The speaker box assembly 400 may be coupled to a frame component, such as frame component 230 in FIG. 3, to form an airtight or substantially airtight volume of air in an interior cavity 412 of the speaker box assembly 400. The speaker box assembly 400 may include one or more speakers. In the example of FIGS. 5-7, the speaker box assembly 400 includes a first speaker 414 and a second speaker 416. The first speaker 414 and the second speaker 416 may be oriented in different or opposite directions. An input/output board 418 with a number of ports may be coupled to the exterior portion of the speaker box assembly 400. For example, the input/output board 418 may be coupled to a bottom surface of the speaker box assembly 400 using one or more screws. A passive radiator 420 may be positioned along an upper surface of the speaker box assembly 400. The passive radiator 420 may be configured to use sound otherwise trapped in the enclosure to excite a resonance corresponding to bass frequencies. The passive radiator 410 may be tuned by varying its mass. In some embodiments, a doghouse component 422 may be coupled to an end of the speaker box assembly 400, where ports on the input/output board 418 are accessible via one or more openings on the doghouse component 422. In some embodiments, the doghouse component 422 may be coupled to the speaker box assembly 400 using adhesive materials. As illustrated in FIG. 7, the front of the speaker box assembly 400 may be formed by a wall, such as a plastic or metal wall. A seal 432 may be formed around a perimeter of the speaker box assembly 400 at an interface between the speaker box assembly 400 and the frame component. The seal may be formed of one or more of an ultraviolet glue, screws, rubber gaskets, and/or other materials. The wall may partially form the cavity 412 and may contribute to the airtight nature of the speaker box assembly 400.

Figure 8:
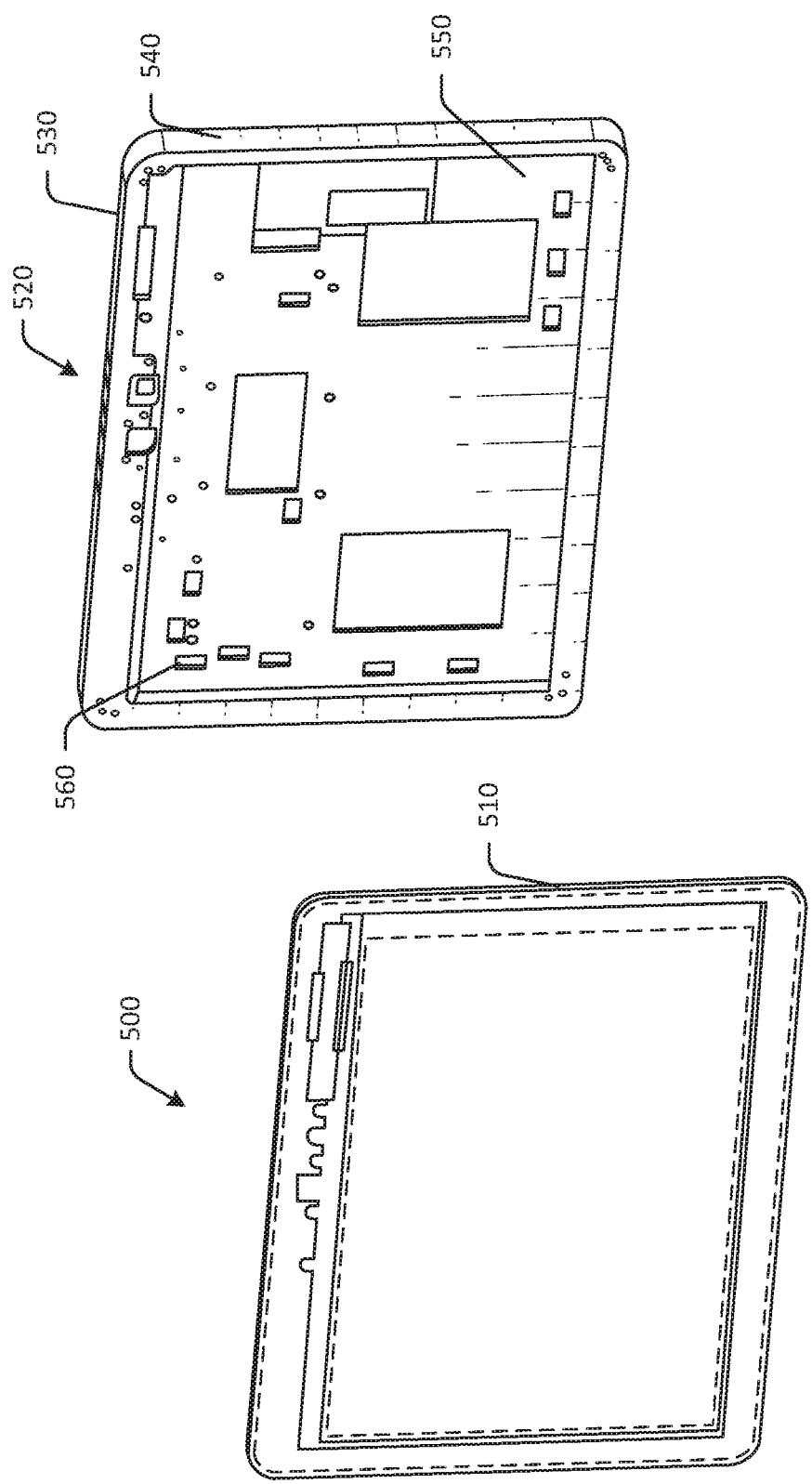
FIG. 8 is a schematic drawing of a display assembly and a frame component in a perspective exploded view in accordance with one or more embodiments of the disclosure.

FIG. 8 is a schematic drawing of a display assembly 500 and a frame component 520 in a perspective exploded view in accordance with one or more embodiments of the disclosure. The display assembly 500 may be a laminated display assembly including one or more of an LCD layer, a touch layer, and a protective cover layer. The display assembly 500 may include one or more microphone holes extending through, for example, a thickness 510 of the protective cover layer.

The frame component 520 may include a front side 550. The display assembly 500 may be aligned with and/or coupled to the front side 550. One or more thermal shields or foam supports 560 may be disposed along the front side 550. The frame component may include one or more microphone holes 520 aligned with the microphone holes on the cover layer of the display assembly 810, as well as microphone holes in a transverse plane. The frame component 520 may include microphone holes at a plane transverse to a plane at which the microphone holes of the display assembly 520 are disposed. For example, a central axis of a microphone hole through the display assembly 520 may be transverse to a central axis of a microphone hole through another surface of the frame component 520 (e.g., the frame component 520 may include microphone holes through a front surface 550 and a top surface 530, etc.). The display assembly 500 may be coupled to the frame component 520 using an adhesive material, one or more screws, and/or other means of coupling. The frame component 520 may include sidewalls 540 that form a recessed portion on a rear side of the frame component 520.

FIGS. 9-12 are schematic drawings of the frame component 520 and various internal components in different stages of assembly in accordance with one or more embodiments of the disclosure.

Figure 9:
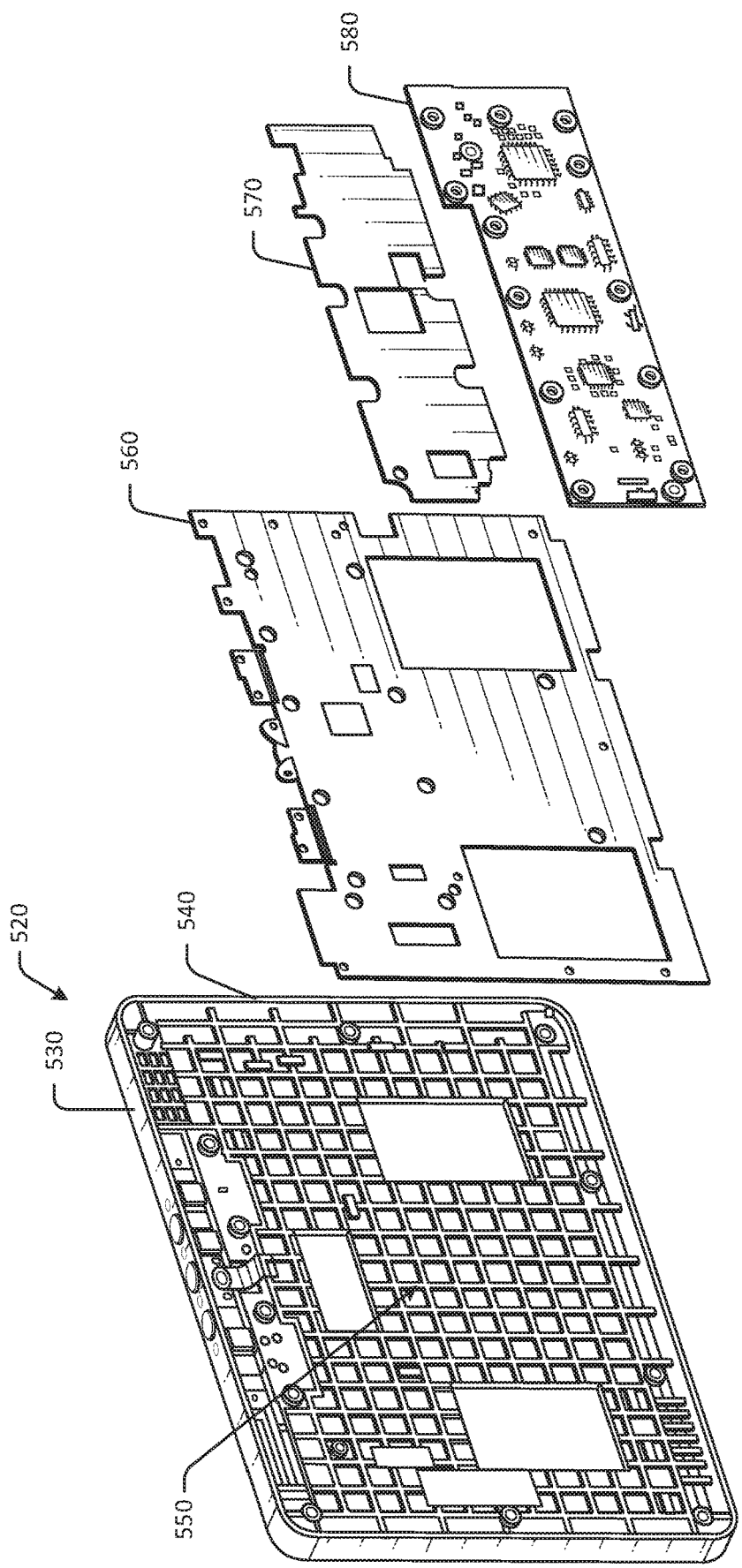
FIGS. 9-11 are schematic drawings of a frame component and various internal components in different stages of assembly in accordance with one or more embodiments of the disclosure.

FIG. 9 illustrates the frame component 520 in a rear perspective view 550. As described above, the sidewalls 540 (which may include the top side 530) may form a recessed portion 550 on a rear side of the frame component 520. The sidewalls 540 may have a thickness of about 15 millimeters and may extend along a perimeter of the frame component 520. A thermal plate 560 may be coupled to the rear side of the frame component 520 and may be disposed in the recessed portion 550. An adhesive layer 570 may be used to couple a main circuit board 580 to the thermal plate 560 and/or the frame component 520. In some embodiments, there may be an air gap between the main circuit board 580 and the thermal plate 560 for grounding. The adhesive layer 570 may be a foam tape with an adhesive on one side. The adhesive layer 570 may be formed of a material that conducts heat with more efficiency than air in some embodiments.

Figure 10:
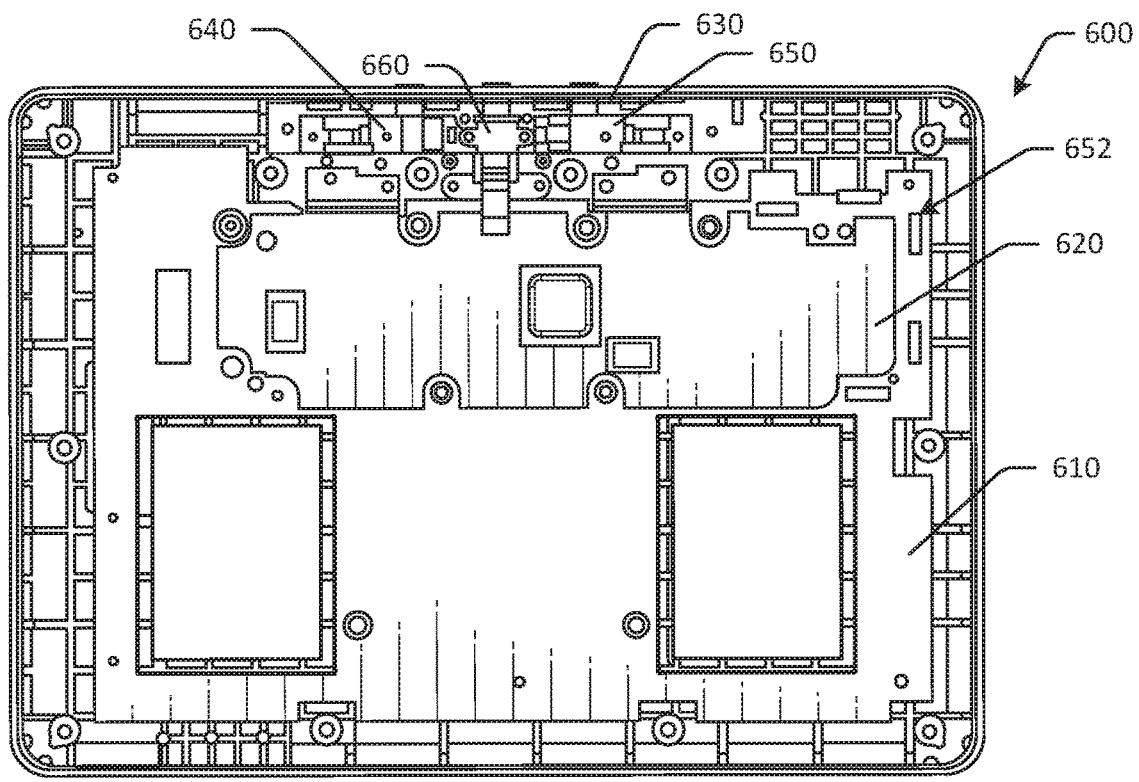

FIG. 10 illustrates the rear side of the frame component 520 with the thermal plate 560 and the adhesive layer 570 coupled to the frame component. Specifically. FIG. 10 illustrates a frame component 600 (which may the frame component 520) with a thermal plate 610 coupled to the recessed portion of the frame component 520, and with the adhesive layer 620 coupled to the thermal plate 610. One or more foam portions 652 may be disposed along edges of the adhesive layer 620 for support of the main circuit board.

Also illustrated in FIG. 10 is a first microphone board 630 with a first microphone array disposed on a lower surface of the top side of the frame component 600, a second microphone board 640 disposed on the rear side of the frame component 600, and a third microphone board 650 disposed on the rear side of the frame component 600 and aligned with the second microphone board 640. In other embodiments, the second microphone board 640 and the third microphone board 650 may be combined into a single microphone board. The microphone boards may have different orientations and positioning than that illustrated in the example of FIG. 10 in other embodiments. In an example embodiment, the first microphone board may be adhered to the lower surface of the top portion of the frame component, and the first microphone board may include a first microphone array having microphones aligned with the first set of microphone holes in the top portion. The first microphone board may be configured to support one or more buttons. The second microphone board 640 and/or the third microphone board 650 may be positioned at a first plane that is substantially parallel to a second plane at which the display assembly is positioned.

A camera 660 may be disposed between the second microphone board 640 and the third microphone board 650.

Figure 11:
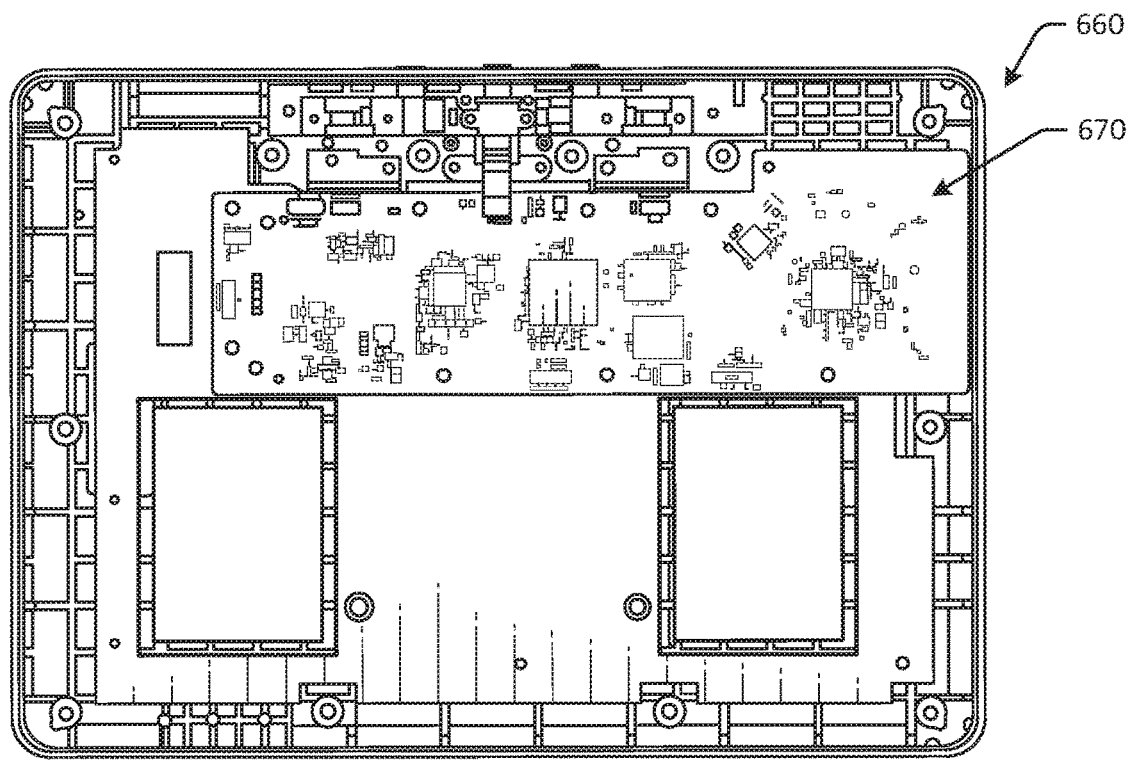

FIG. 11 depicts the rear side of the frame component 520 with a main circuit board 670 (which may be the main circuit board 580) coupled to the adhesive layer 570. One or more screws may be used to secure the main circuit board 670 to the thermal plate and/or frame component 620.

Figure 12:
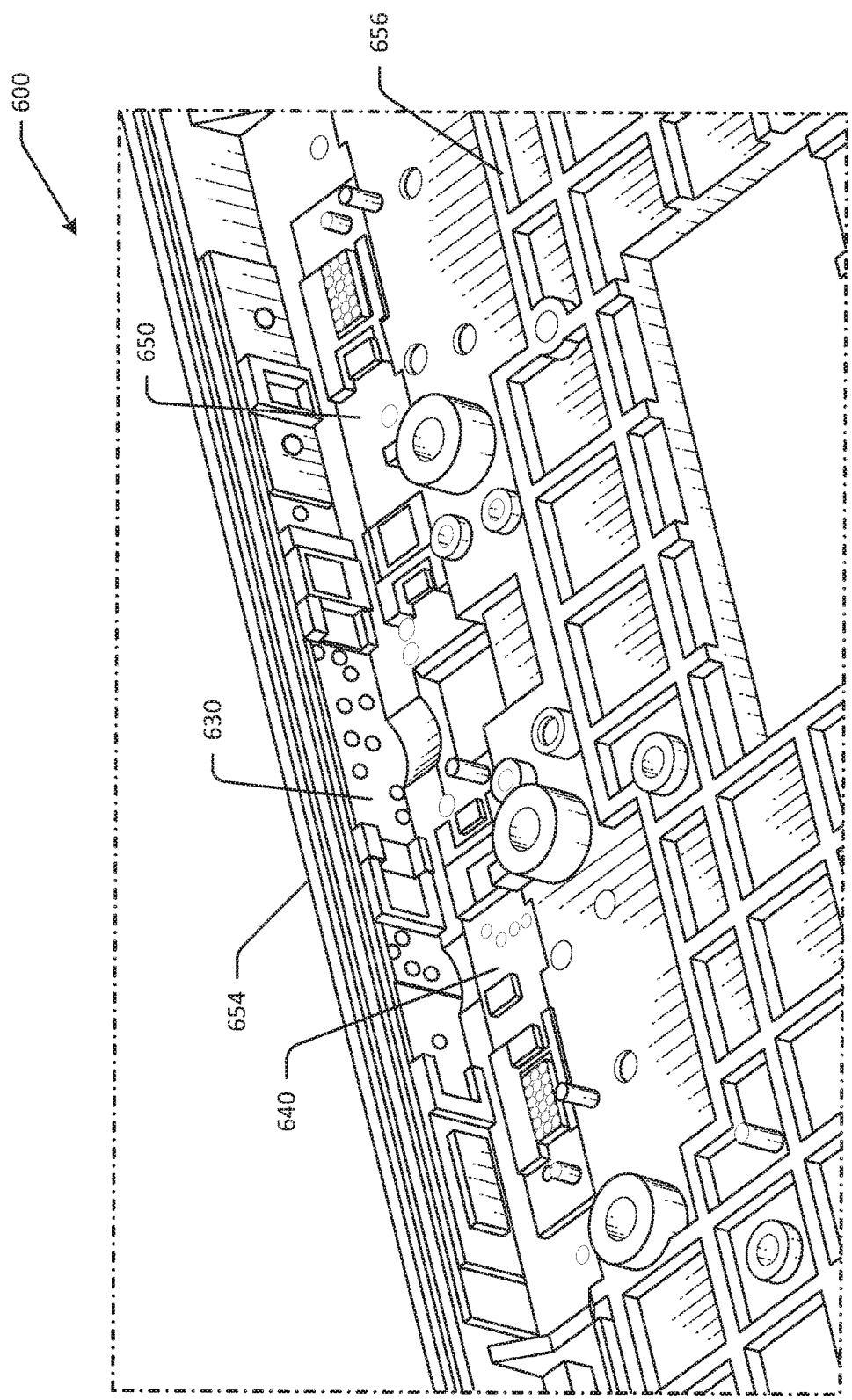
FIG. 12 is a schematic drawing of a detail perspective view of a microphone board arrangement in accordance with one or more embodiments of the disclosure.

FIG. 12 depicts the frame component 600 in a close up rear perspective view. As illustrated in FIG. 12, the first microphone board 630 may be disposed at a first plane along a bottom surface of a top side 654 of the frame component 600. The second microphone board 640 and the third microphone board 650 may be coplanar and may be disposed at a second plane along a rear surface 656 of the frame component 600. The first plane may be transverse to the second plane. The first plane may be perpendicular to the second plane in some instances. The second microphone board 640 may be discrete and separate from the third microphone board 650. In some embodiments, the second microphone board 640 and the third microphone board 650 may be disposed along the same or different lateral axes of the frame component 600.

Figure 13:
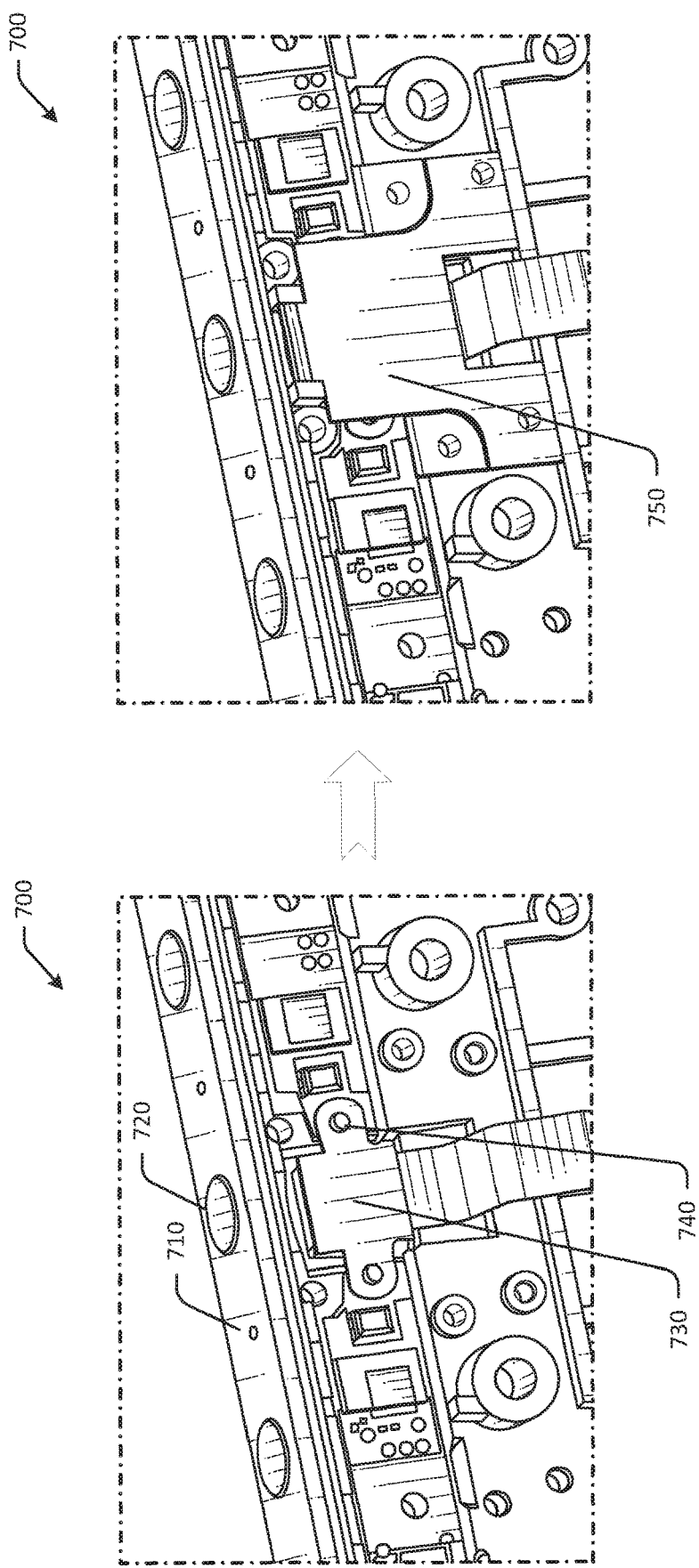
FIG. 13 is a schematic drawing of a frame component and camera assembly in different stages of assembly in accordance with one or more embodiments of the disclosure.

FIG. 13 is a schematic drawing of a frame component 700 and camera assembly in different stages of assembly in accordance with one or more embodiments of the disclosure. The frame component 700 may be the same or different than the frame components discussed with respect to FIGS. 1-12.

FIG. 13 depicts the frame component in a rear perspective view. A microphone hole 710 extending through a top wall of the frame component 700 is depicted. Adjacent to the microphone hole 710, a pressable button 720 may be accessible via the top wall of the frame component 700. The pressable button 720 may be coupled to the top microphone board and may be secured with, for example, adhesive. A camera 730 may be coupled to the rear surface of the frame component 700. One or more guide pins 740 may be used for placement of the camera 730. A camera carrier and heatsink 750 may be mounted or coupled adjacent to the camera 730, as illustrated in FIG. 13.

Figure 14:
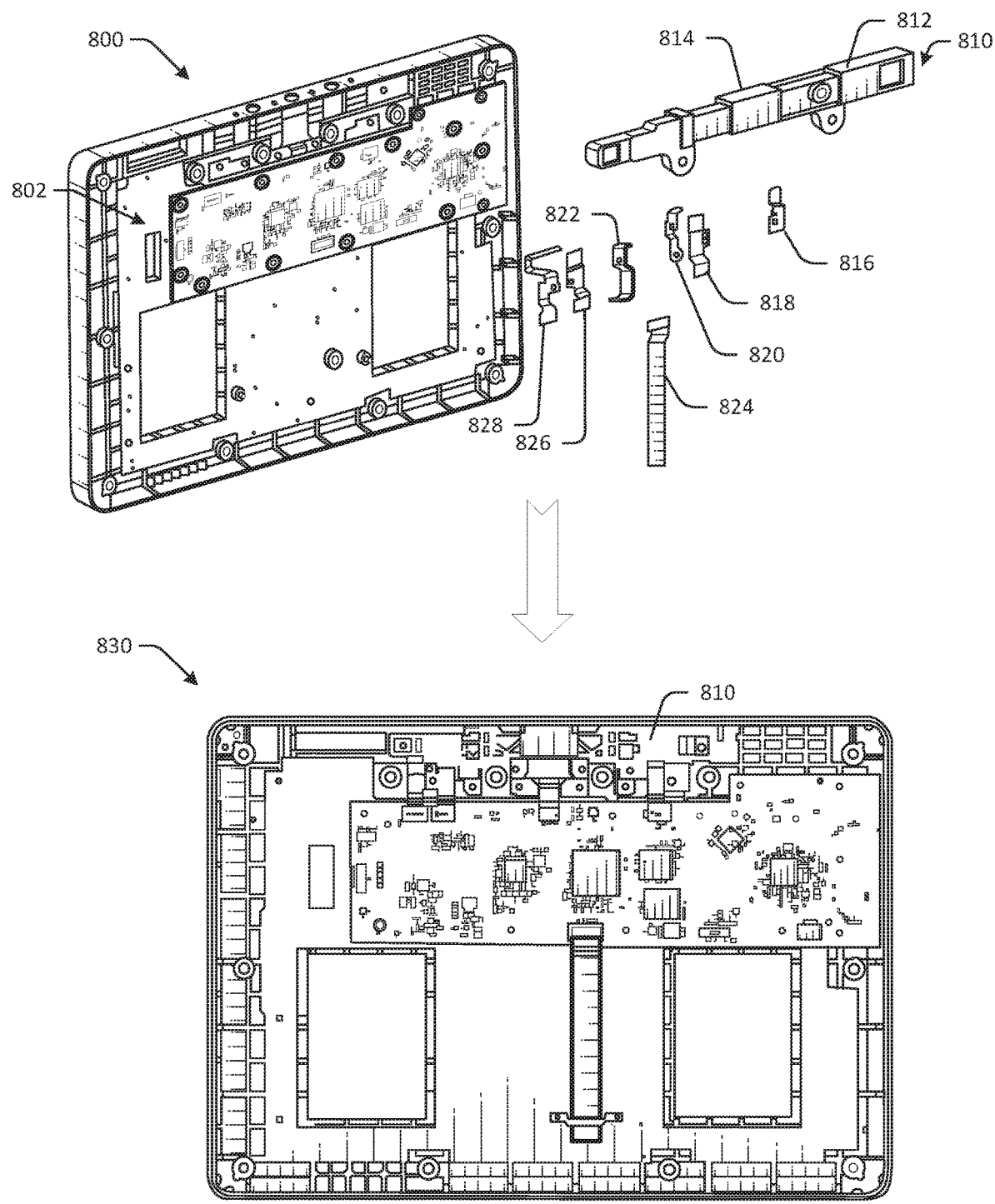
FIG. 14 is a schematic drawing of a frame component, microphone board support component, and grounding components in different stages of assembly in accordance with one or more embodiments of the disclosure.

FIG. 14 is a schematic drawing of a frame component 800, microphone board support component 810, and grounding components in different stages of assembly in accordance with one or more embodiments of the disclosure. The frame component 800 may be the same or different than the frame components discussed with respect to FIGS. 1-13.

As illustrated in FIG. 14, a main circuit board 802 may be coupled to the frame component 800. A microphone board support component 810 may be coupled to the rear surface of the frame component 800 using one or more screws. The microphone board support component 810 may include an upper surface 812 that is in contact with the first microphone board disposed under the top wall of the frame component 800, as illustrated in the assembled view 830 in FIG. 14.

The microphone board support component 810 may include a front surface 814 that is parallel to the rear surface of the frame component 800 and is in contact with one or more grounding clips. For example, a first ground clip 816 configured to ground the third microphone board may be coupled to the third microphone board. A first microphone board flexible printed circuit 818 may be coupled to the third microphone board. A second ground clip 820 configured to ground the first microphone board (under the top surface) may be coupled to the first microphone board. An input/output flexible printed circuit 824 may be coupled to the one or more button circuits. A third ground clip 822 configured to ground the second microphone board may be coupled to the second microphone board. A second microphone board flexible printed circuit 826 may be coupled to the third microphone board. A third microphone board flexible printed circuit 828 may be coupled to the first microphone board.

The microphone board support component 810 may be positioned so as to apply pressure to and/or compress the respective grounding clips 816, 820, 822 and reduce resistance. The microphone board support component 810 may not be attached to the top side of the frame component 800, but may be configured to compress the grounding clip for the first microphone board nonetheless. In some embodiments, the microphone board support component 810 may be attached to the top side and/or the rear surface of the frame component 800.

As illustrated in the assembled state 830, the microphone board support component 810 may be in contact with one or more of the grounding clips and flexible printed circuit components. As a result of the positioning and attachment or coupling of the microphone board support component 810, additional screws or coupling means may not be need to secure the electrical components.

Figure 15:
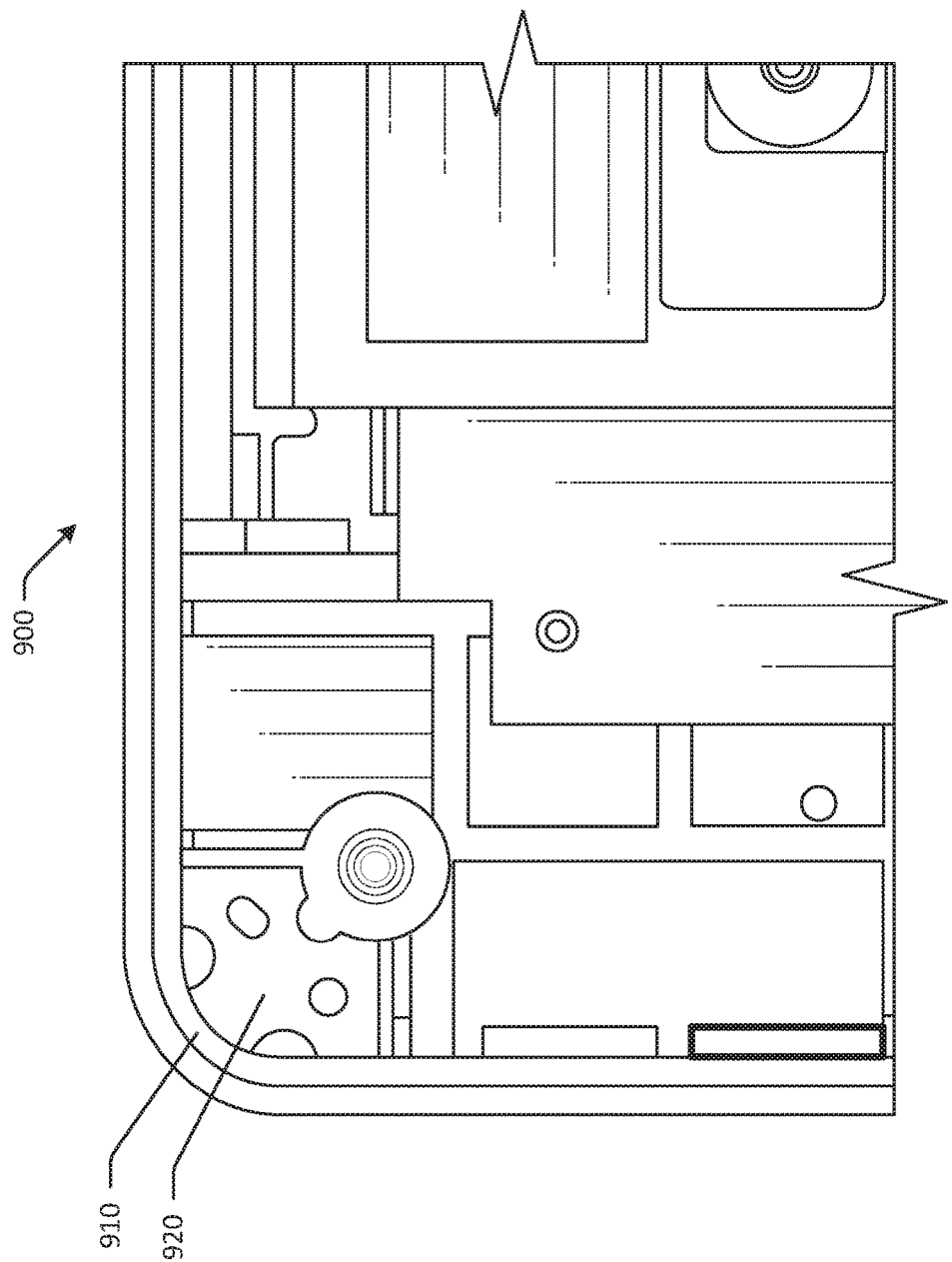
FIG. 15 is a schematic drawing of a corner insert in accordance with one or more embodiments of the disclosure.

FIG. 15 is a schematic drawing of a corner insert or corner support of a frame component 900 in accordance with one or more embodiments of the disclosure. The frame component 900 may be the same or different than the frame components discussed with respect to FIGS. 1-14.

In some embodiments, a metal injection molded insert 920 may be disposed at one or more corners 910 on the rear side of the frame component 900. The metal injection molded insert may be located at corners of the frame component 900 to stiffen the corners and to provide enhanced protection for devices that may have edge to edge displays or glass, or no bezel. The frame component 900 may be formed of plastic, while the insert 920 may be formed of metal, such as steel.

Figure 16:
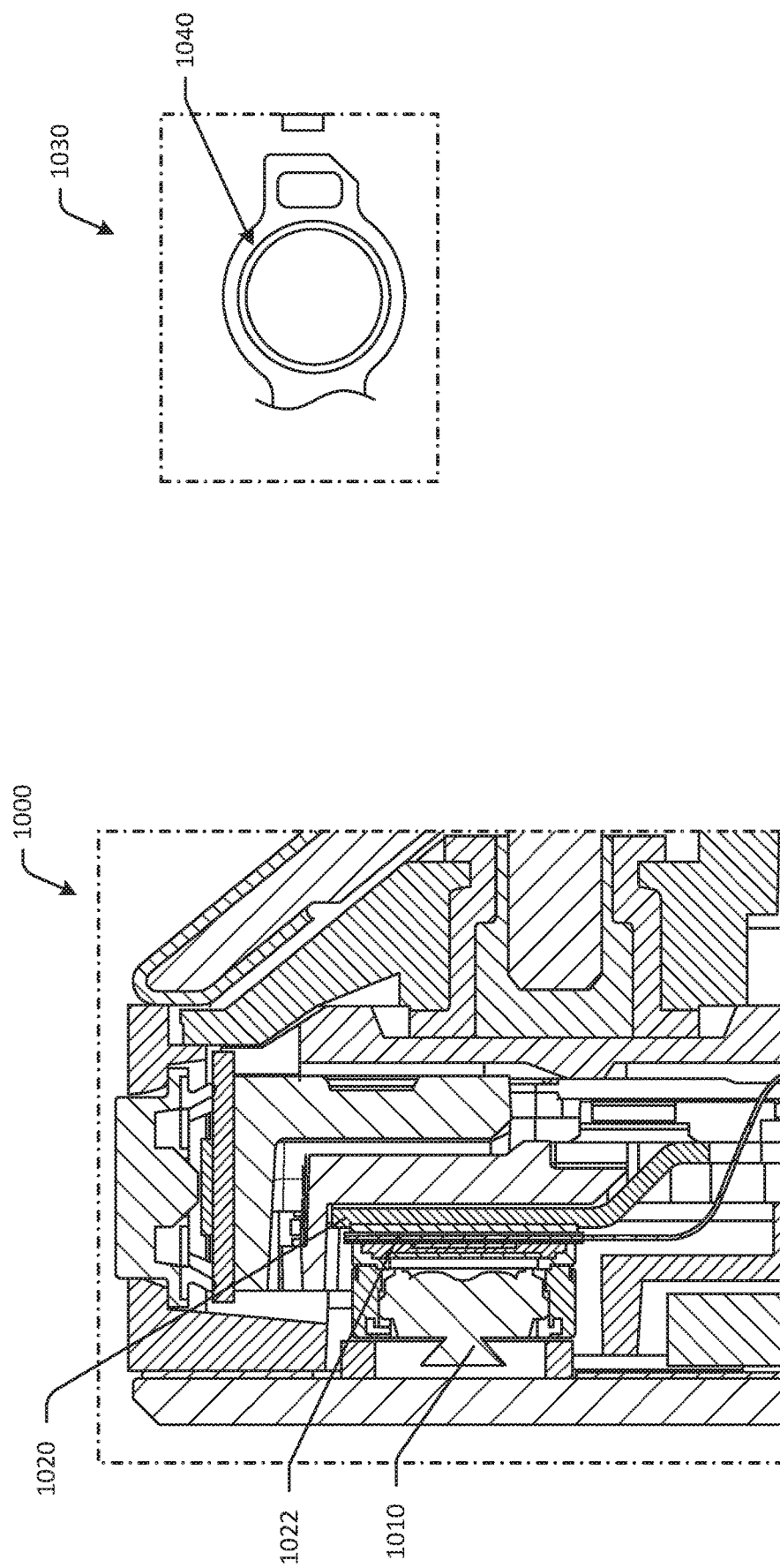
FIG. 16 is a schematic drawing of a heat sink stack in a side view and buttons in a top view in accordance with one or more embodiments of the disclosure.

FIG. 16 is a schematic drawing of a heat sink stack 1000 in a side view and buttons 1030 in a top view in accordance with one or more embodiments of the disclosure.

The heat sink stack 1000 may include a heat sink 1020 disposed adjacent to a rear end of a camera 1010. In some embodiments, the camera 1010 may be susceptible to tilting due to a lack of mechanical attachment of the camera 1010 to the frame component. Accordingly, to mitigate the risk of tilt or dislocation, an adhesive layer 1022 may be disposed between the heat sink 1020 and the camera 1010 (or camera carrier). The heat sink 1020 may therefore serve not only to remove heat, but to stabilize the camera 1010 as well.

As illustrated in FIG. 16, pressable buttons 1030 may include a raised portion 1040 that is positioned to extend through one or more openings in the frame component. Users may engage the button via the respective surface of the device.

Figure 17:
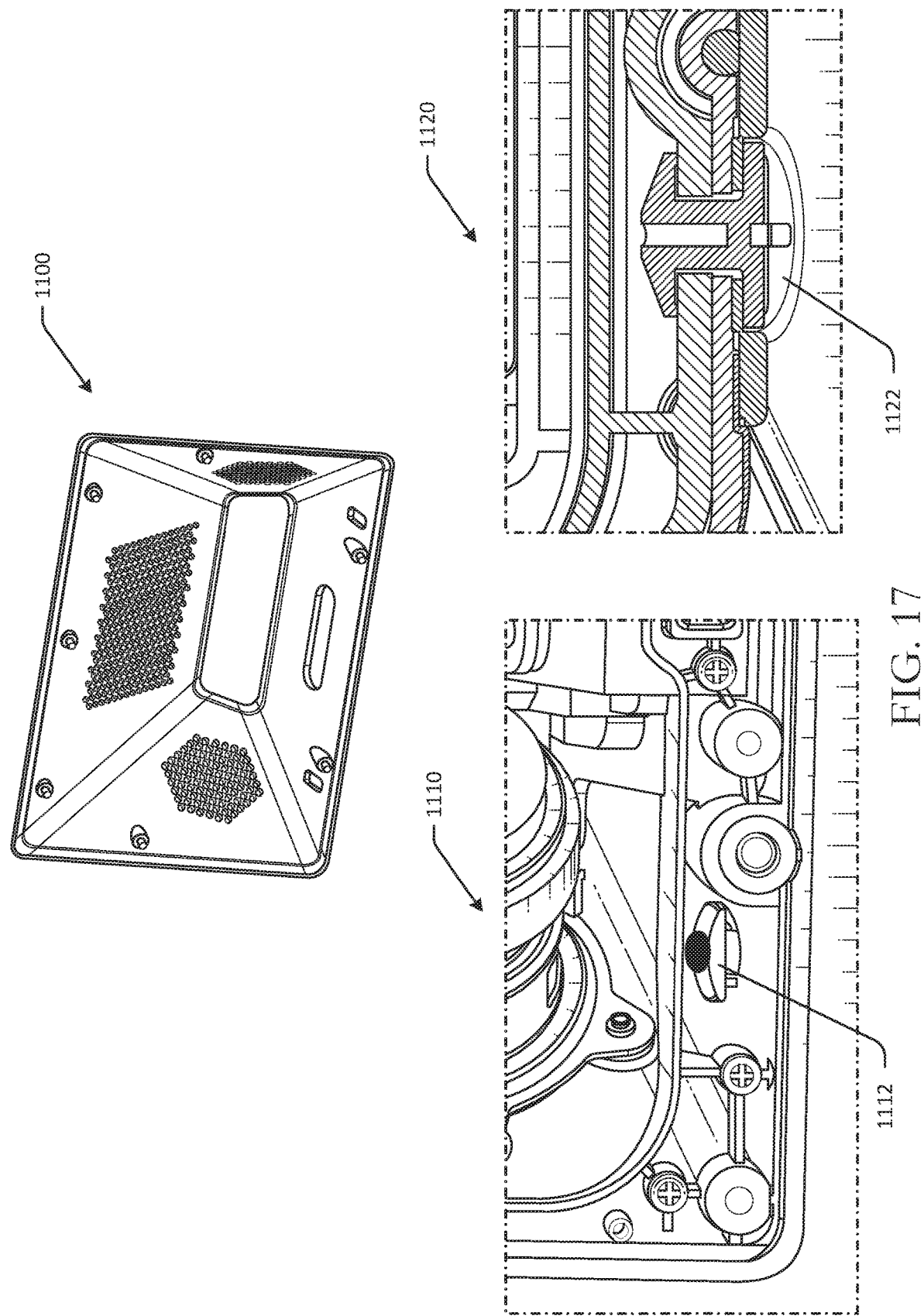
FIG. 17 is a schematic drawing of a fabric cover and coupling mechanism in accordance with one or more embodiments of the disclosure.

FIG. 17 is a schematic drawing of a fabric cover 1100 and coupling mechanism in accordance with one or more embodiments of the disclosure. In some embodiments, fabric covers 1100 may be removable and replaceable with other fabric covers, so that users may personalize their device. To couple and/or decouple fabric covers from a device, some embodiments may use a plastic screw engagement that locks the fabric cover to the device.

For example, in a first view 1110 of a device housing without a fabric cover attached, the device housing may include an opening 1112 for a lock screw. In a second view 1120, the fabric cover 1100 may be coupled to the housing using a lock screw 1122. The lock screw 1122 may be a discrete component or may be coupled to the fabric cover 1100. The lock screw may extend through the fabric cover and into the housing, and a twist of the lock screw from outside the device may secure the fabric cover in place. To remove the fabric cover, the lock screw 1122 may be turned in the opposite direction.

Figure 18:
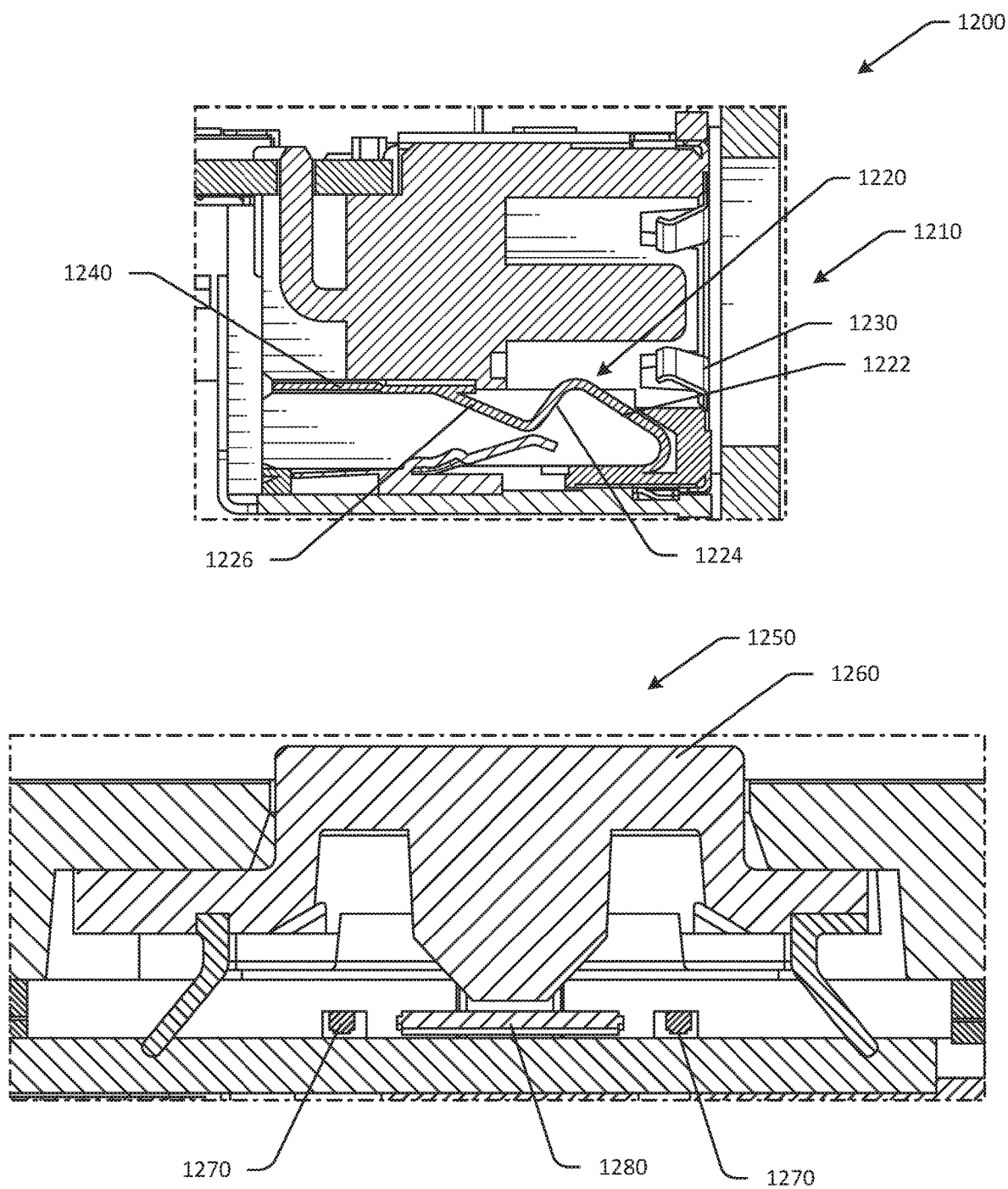
FIG. 18 is a schematic drawing of a power adapter receptacle and button assembly in accordance with one or more embodiments of the disclosure.

FIG. 18 is a schematic drawing of a power adapter receptacle 1200 and button assembly 1250 in accordance with one or more embodiments of the disclosure. The power adapter receptacle 1200 may include an entrance 1210 at which a power adapter may be coupled to the device. The power adapter receptacle 1200 may include one or more primary ground components 1220 and one or more secondary ground components 1230. A power pin of a power adapter may be inserted into the power adapter receptacle 1200 and may engage the primary ground 1220 and the secondary ground 1230.

The primary ground 1220 may include a first portion 1222, a second portion 1224 transverse to the first portion 1222, and a third portion 1226 transverse to the second portion 1224 (and optionally parallel to the first portion 1222). Angels between the first portion 1222 and the second portion 1224, and between the second portion 1224 and the third portion 1226, may be the same or different. The angles may be optimized for yank strength and to prevent permanent deformation resulting from insertion of a power adapter.

The secondary ground 1230 may be configured to contact the power adapter ground shield before the power pin of the power adapter contacts the plug receptacle.

A sense line 1240 may be in electrical communication with the third portion 1226 of the primary ground 1220. Depending on whether the power adapter is engaged with the primary ground 1220, the sense line 1240 may provide logic related to when capacitors can discharge.

An inside diameter of the power adapter receptacle 1200 and/or power pin length of the power adapter can be selected to minimize yank rise and to prevent engagement of power pin before the secondary ground engages the outside ground of the power pin of the power adapter.

The button assembly 1250 may include an injection molded button 1260 with a translucency of about 14% (e.g., a resin material having a translucency of equal to or greater than about 10% and less than or equal to about 15%, etc.), and may be covered with a paint layer. The button 1260 may be configured to engage a button switch 1280 when depressed. One or more LEDs 1270 may be disposed on a printed circuit board coupled to the button switch 1280. Light emitted by the LEDs 1270 may be visible through the button 1260. The paint layer may include a primer having a thickness between about 16-25 microns, a base coat having a thickness between about 8-15 microns, and a top coat having a thickness between about 8-15 microns, for a total thickness of about 32-about 55 microns.

Example embodiments of the disclosure provide a number of technical features or technical effects. For example, in accordance with example embodiments of the disclosure, certain embodiments of the disclosure include voice-activated display devices with improved wakeword detection resulting from placement of microphone arrays in transverse planes. For example, by placing a first microphone array in a front-facing orientation aligned with the display, and a second microphone array aligned with a top of the device, beamforming for wakeword detection is improved, along with increased accuracy in detecting a location of a user that said the wakeword. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

One or more operations of the methods, process flows, or use cases of FIGS. 1-18 may have been described above as being performed by a user device, or more specifically, by one or more program module(s), applications, or the like executing on a device. It should be appreciated, however, that any of the operations of the methods, process flows, or use cases of FIGS. 1-18 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-18 may be described in the context of the illustrative devices, it should be appreciated that such operations may be implemented in connection with numerous other device configurations.

The operations described and depicted in the illustrative methods, process flows, and use cases of FIGS. 1-18 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-18 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 19:
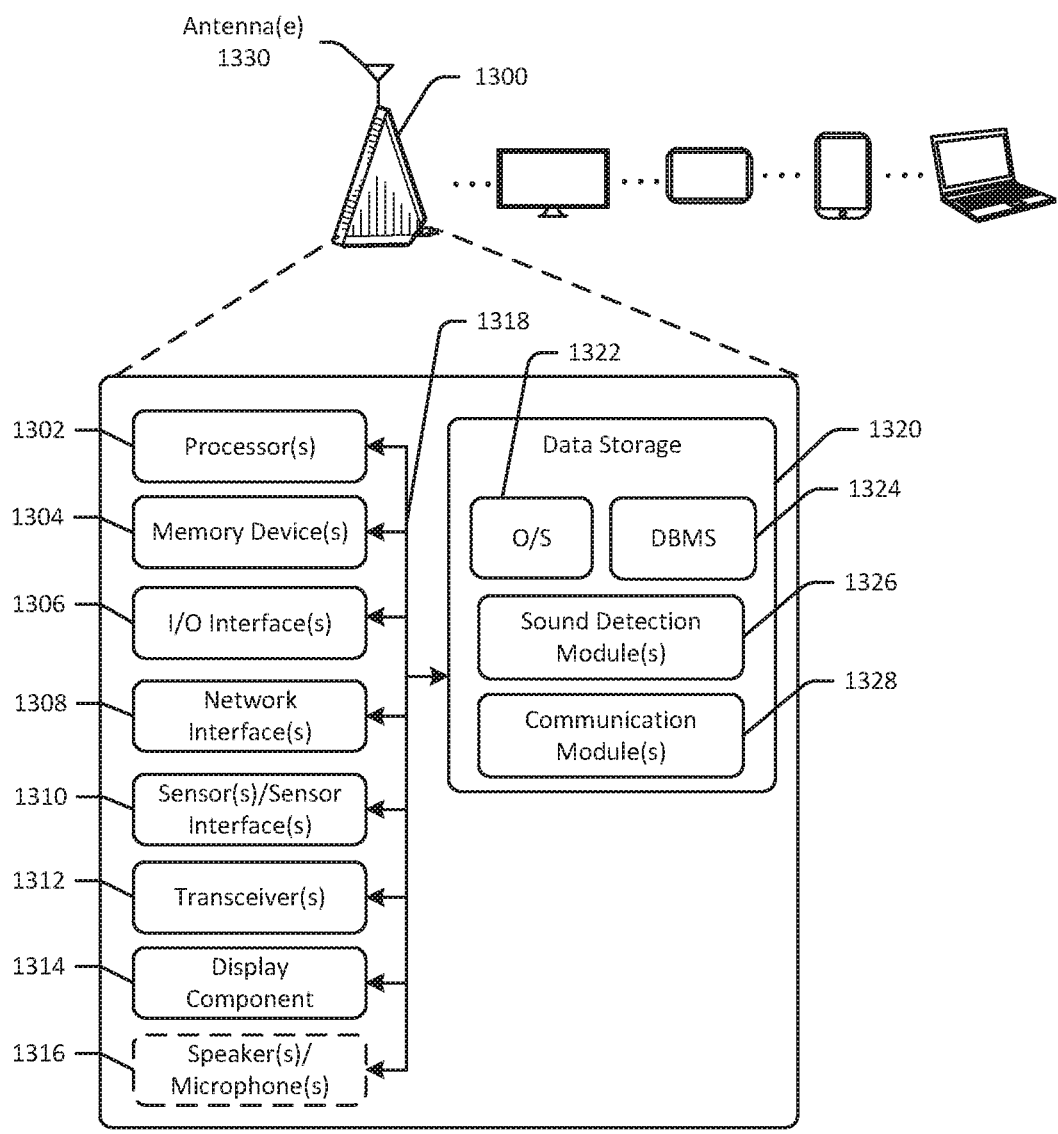
FIG. 19 schematically illustrates an example architecture of a portable electronic device in accordance with one or more embodiments of the disclosure.

FIG. 19 is a schematic block diagram of one or more illustrative display device(s) 1300 in accordance with one or more example embodiments of the disclosure. The display device(s) 1300 may include any suitable computing device with an optional display, in some instances, including, but not limited to, a server system, a mobile device such as a smartphone, a tablet, an e-reader, a wearable device, or the like; a desktop computer; a laptop computer; a content streaming device; a set-top box; a scanning device; a speaker device; or the like. The display device(s) 1300 may correspond to an illustrative device configuration for the scanning device of FIGS. 1-18.

The display device(s) 1300 may be configured to communicate with one or more servers, user devices, or the like. The display device(s) 1300 may be configured to determine voice commands, determine wakeword utterances, determine and/or control other devices, and other operations. The display device(s) 1300 may be configured to emit light, detect sound, output digital content, and other functionality. In some embodiments, a single remote server or a single group of remote servers may be configured to perform more than one type of functionality in conjunction with a display device.

The display device(s) 1300 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the display device(s) 1300 may include one or more processors (processor(s)) 1302, one or more memory devices 1304 (also referred to herein as memory 1304), one or more input/output (I/O) interface(s) 1306, one or more network interface(s) 1308, one or more sensor(s) or sensor interface(s) 1310, one or more transceiver(s) 1312, one or more display components 1314, and one or more optional camera(s)/microphone(s) 1316, and data storage 1320. The display device(s) 1300 may further include one or more bus(es) 1318 that functionally couple various components of the display device(s) 1300. The display device(s) 1300 may further include one or more antenna(e) 1330 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1318 may include at least one of a system bus, a memory bus, an address bus, or a message bus, and may permit the exchange of information (e.g., data (including computer-executable code), signaling, etc.) between various components of the display device(s) 1300. The bus(es) 1318 may include, without limitation, a memory bus or a memory controller, a peripheral bus, an accelerated graphics port, and so forth. The bus(es) 1318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1304 of the display device(s) 1300 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1320 may include removable storage and/or non-removable storage including, but not limited to, magnetic storage, optical disk storage, and/or tape storage. The data storage 1320 may provide non-volatile storage of computer-executable instructions and other data. The memory 1304 and the data storage 1320, removable and/or non-removable, are examples of computer-readable storage media (CRSM) as that term is used herein.

The data storage 1320 may store computer-executable code, instructions, or the like that may be loadable into the memory 1304 and executable by the processor(s) 1302 to cause the processor(s) 1302 to perform or initiate various operations. The data storage 1320 may additionally store data that may be copied to the memory 1304 for use by the processor(s) 1302 during the execution of the computer-executable instructions. Moreover, output data generated as a result of execution of the computer-executable instructions by the processor(s) 1302 may be stored initially in the memory 1304, and may ultimately be copied to the data storage 1320 for non-volatile storage.

More specifically, the data storage 1320 may store one or more operating systems (O/S) 1322; one or more database management systems (DBMS) 1324; and one or more program module(s), applications, engines, computer-executable code, scripts, or the like such as, for example, one or more sound detection module(s) 1326 and/or one or more communication module(s) 1328. Some or all of these module(s) may be sub-module(s). Any of the components depicted as being stored in the data storage 1320 may include any combination of software, firmware, and/or hardware. The software and/or firmware may include computer-executable code, instructions, or the like that may be loaded into the memory 1304 for execution by one or more of the processor(s) 1302. Any of the components depicted as being stored in the data storage 1320 may support functionality described in reference to corresponding components named earlier in this disclosure.

The data storage 1320 may further store various types of data utilized by the components of the display device(s) 1300. Any data stored in the data storage 1320 may be loaded into the memory 1304 for use by the processor(s) 1302 in executing computer-executable code. In addition, any data depicted as being stored in the data storage 1320 may potentially be stored in one or more datastore(s) and may be accessed via the DBMS 1324 and loaded in the memory 1304 for use by the processor(s) 1302 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 19, an example datastore(s) may include, for example, historical data for previously identified users, user profile information, and/or other information.

The processor(s) 1302 may be configured to access the memory 1304 and execute the computer-executable instructions loaded therein. For example, the processor(s) 1302 may be configured to execute the computer-executable instructions of the various program module(s), applications, engines, or the like of the display device(s) 1300 to cause or facilitate various operations to be performed in accordance with one or more embodiments of the disclosure. The processor(s) 1302 may include any suitable processing unit capable of accepting data as input, processing the input data in accordance with stored computer-executable instructions, and generating output data. The processor(s) 1302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1302 may be capable of supporting any of a variety of instruction sets.

Referring now to functionality supported by the various program module(s) depicted in FIG. 19, the sound detection module(s) 1326 may include computer-executable instructions, code, or the like that responsive to execution by one or more of the processor(s) 1302 may perform functions including, but not limited to, detect sound, determine sound meanings, generate audio signals and audio data, determine a location of sound, determining a display status, determining which LEDs to illuminate, causing a change in illumination status, and the like.

The communication module(s) 1328 may include computer-executable instructions, code, or the like that responsive to execution by one or more of the processor(s) 1302 may perform functions including, but not limited to, sending and/or receiving data, including content, sending and/or receiving instructions and commands, and the like.

Referring now to other illustrative components depicted as being stored in the data storage 1320, the O/S 1322 may be loaded from the data storage 1320 into the memory 1304 and may provide an interface between other application software executing on the display device(s) 1300 and the hardware resources of the display device(s) 1300. More specifically, the O/S 1322 may include a set of computer-executable instructions for managing the hardware resources of the display device(s) 1300 and for providing common services to other application programs (e.g., managing memory allocation among various application programs). In certain example embodiments, the O/S 1322 may control execution of the other program module(s). The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the display device(s) 1300 is a mobile device, the DBMS 1324 may be any suitable lightweight DBMS optimized for performance on a mobile device.

Referring now to other illustrative components of the display device(s) 1300, the input/output (I/O) interface(s) 1306 may facilitate the receipt of input information by the display device(s) 1300 from one or more I/O devices as well as the output of information from the display device(s) 1300 to the one or more I/O devices. The I/O devices may include any of a variety of components such as a display or display screen having a touch surface or touchscreen; an audio output device for producing sound, such as a speaker, an audio capture device, such as a microphone; an image and/or video capture device, such as a camera; a haptic unit; and so forth. Any of these components may be integrated into the display device(s) 1300 or may be separate. The I/O devices may further include, for example, any number of peripheral devices such as data storage devices, printing devices, and so forth.

The I/O interface(s) 1306 may also include an interface for an external peripheral device connection such as universal serial bus (USB), FireWire, Thunderbolt, Ethernet port or other connection protocol that may connect to one or more networks. The I/O interface(s) 1306 may also include a connection to one or more of the antenna(e) 1330 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The display device(s) 1300 may further include one or more network interface(s) 1308 via which the display device(s) 1300 may communicate with any of a variety of other systems, platforms, networks, devices, and so forth. The network interface(s) 1308 may enable communication, for example, with one or more wireless routers, one or more host servers, one or more web servers, and the like via one or more networks.

The antenna(e) 1330 may include any suitable type of antenna depending, for example, on the communications protocols used to transmit or receive signals via the antenna(e) 1330. Non-limiting examples of suitable antennae may include directional antennae, non-directional antennae, dipole antennae, folded dipole antennae, patch antennae, multiple-input multiple-output (MIMO) antennae, or the like. The antenna(e) 1330 may be communicatively coupled to one or more transceivers 1312 or radio components to which or from which signals may be transmitted or received.

As previously described, the antenna(e) 1330 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1330 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1330 may be configured to transmit or receive radio frequency signals within any suitable frequency range forming part of the unlicensed portion of the radio spectrum.

The antenna(e) 1330 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1312 may include any suitable radio component(s) for—in cooperation with the antenna(e) 1330—transmitting or receiving radio frequency (RF) signals in the bandwidth and/or channels corresponding to the communications protocols utilized by the display device(s) 1300 to communicate with other devices. The transceiver(s) 1312 may include hardware, software, and/or firmware for modulating, transmitting, or receiving—potentially in cooperation with any of antenna(e) 1330—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1312 may further include hardware, firmware, or software for receiving GNSS signals. The transceiver(s) 1312 may include any known receiver and baseband suitable for communicating via the communications protocols utilized by the display device(s) 1300. The transceiver(s) 1312 may further include a low noise amplifier (LNA), additional signal amplifiers, an analog-to-digital (A/D) converter, one or more buffers, a digital baseband, or the like.

The sensor(s)/sensor interface(s) 1310 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The display component(s) 1314 may include one or more display layers, such as LED or LCD layers, touch screen layers, protective layers, and/or other layers. The optional camera(s) 1316 may be any device configured to capture ambient light or images. The optional microphone(s) 1316 may be any device configured to receive analog sound input or voice data. The microphone(s) 1316 may include the microphone arrays arranged as described herein.

It should be appreciated that the program module(s), applications, computer-executable instructions, code, or the like depicted in FIG. 19 as being stored in the data storage 1320 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the display device(s) 1300, and/or hosted on other computing device(s) accessible via one or more networks, may be provided to support functionality provided by the program module(s), applications, or computer-executable code depicted in FIG. 19 and/or additional or alternate functionality. Further, functionality may be modularized differently such that processing described as being supported collectively by the collection of program module(s) depicted in FIG. 19 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 19 may be implemented, at least partially, in hardware and/or firmware across any number of devices.

It should further be appreciated that the display device(s) 1300 may include alternate and/or additional hardware, software, or firmware components beyond those described or depicted without departing from the scope of the disclosure. More particularly, it should be appreciated that software, firmware, or hardware components depicted as forming part of the display device(s) 1300 are merely illustrative and that some components may not be present or additional components may be provided in various embodiments. While various illustrative program module(s) have been depicted and described as software module(s) stored in the data storage 1320, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-18 may be performed by a device having the illustrative configuration depicted in FIG. 19, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-18 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-18 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
   a frame that forms a rear portion of the device;
   a display assembly coupled to the frame, wherein the display assembly forms a front portion of the device, and wherein a first vertical axis of the display assembly is positioned at a fixed acute angle relative to a second vertical axis of the frame;
   a first microphone hole extending through a front face of the display assembly;
   a second microphone hole extending through the front face of the display assembly;
   a speaker coupled to the frame and oriented such that a majority of sound output from the speaker is directed towards the rear portion of the device;
   a power adapter receptacle coupled to the frame; and
   a fabric cover disposed over the frame, the fabric cover comprising an aperture aligned with the power adapter receptacle.

2. The device of claim 1, further comprising:
   a slideable switch disposed on a top side of the display assembly.

3. The device of claim 1, further comprising:
   an ambient light sensor disposed on the front face of the display assembly;
   wherein the ambient light sensor is disposed between the first microphone hole and the second microphone hole.

4. The device of claim 1, further comprising:
   a plurality of supports coupled to the fabric cover along a lower surface of the device.

5. The device of claim 1, wherein the display assembly comprises:
   a plastic frame; and
   a display coupled to the plastic frame;
   wherein the plastic frame forms a rear surface of the display, and the plastic frame is disposed between the display and the frame.

6. The device of claim 1, wherein the fabric cover covers a lower surface of the frame.

7. The device of claim 1, wherein the device is a voice-activated device, and wherein the device is configured to automatically initiate an ambient environment mode.

8. The device of claim 1, wherein an upper surface of the display assembly is devoid of holes.

9. The device of claim 1, further comprising:
   a microphone board component attached to the frame, wherein the microphone board component comprises a first microphone aligned with the first microphone hole, and a second microphone aligned with the second microphone hole.

10. The device of claim 1, wherein the fabric cover comprises a knit yarn material having a dip-in oil repellant on an outer surface of the fabric cover.

11. A voice-activated device comprising:
a frame that forms a rear portion of the device;
a display assembly coupled to the frame, wherein the display assembly forms a front portion of the device, and wherein a first vertical axis of the display assembly is positioned at a fixed acute angle relative to a second vertical axis of the frame;
a set of microphone holes extending through a front face of the display assembly;
a speaker coupled to the frame and oriented such that a majority of sound output from the speaker is directed towards the rear portion of the device; and
a fabric cover disposed over the frame, the fabric cover comprising an aperture disposed along the rear portion of the device;
wherein the fabric cover comprises a knit yarn material.

12. The voice-activated device of claim 11, further comprising:
a power adapter receptacle coupled to the frame;
wherein the aperture is aligned with the power adapter receptacle.

13. The voice-activated device of claim 11, wherein the fabric cover comprises an oil repellant on an outer surface of the fabric cover.

14. The voice-activated device of claim 11, further comprising:
a slideable switch disposed on a top side of the display assembly.

15. The voice-activated device of claim 11, further comprising:
an ambient light sensor disposed on the front face of the display assembly;
wherein the ambient light sensor is disposed between the first microphone hole and the second microphone hole.

16. The voice-activated device of claim 11, wherein the display assembly comprises:
a plastic frame; and
a display coupled to the plastic frame;
wherein the plastic frame forms a rear surface of the display, and the plastic frame is disposed between the display and the frame.

17. The voice-activated device of claim 11, wherein an upper surface of the display assembly is devoid of holes.

18. The device of claim 1, wherein the display assembly is coupled to a top of the frame; and
wherein the speaker is oriented with a face of the speaker towards the rear portion of the device.

* * * * *